(12) United States Patent
Kim et al.

(10) Patent No.: US 9,575,700 B2
(45) Date of Patent: Feb. 21, 2017

(54) IMAGE FORMING APPARATUS AND METHOD OF CLONING USING MOBILE DEVICE

(71) Applicant: Samsung Electronics Co., Ltd., Suwon-si, Gyeonggi-do (KR)

(72) Inventors: Ki-tae Kim, Suwon-si (KR); Hye-jin Lee, Suwon-si (KR); Wu-seok Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/621,753

(22) Filed: Feb. 13, 2015

(65) Prior Publication Data
US 2015/0286452 A1 Oct. 8, 2015

(30) Foreign Application Priority Data
Apr. 2, 2014 (KR) .......... 10-2014-0039358

(51) Int. Cl.
*G06F 3/12* (2006.01)
*H04N 1/00* (2006.01)
*G06K 15/02* (2006.01)

(52) U.S. Cl.
CPC ............ *G06F 3/1292* (2013.01); *G06F 3/123* (2013.01); *G06F 3/1209* (2013.01); *G06F 3/1246* (2013.01); *G06F 3/1298* (2013.01); *G06K 15/1809* (2013.01); *G06K 15/1811* (2013.01); *H04N 1/00103* (2013.01); *H04N 1/00307* (2013.01); *H04N 1/00342* (2013.01); *H04N 2201/006* (2013.01); *H04N 2201/0055* (2013.01); *H04N 2201/0075* (2013.01); *H04N 2201/0094* (2013.01)

(58) Field of Classification Search
USPC ........................................... 358/1.13
See application file for complete search history.

(56) References Cited

U.S. PATENT DOCUMENTS

| | | | |
|---|---|---|---|
| 2005/0286071 A1* | 12/2005 | Faynor ............... | G06F 3/1204 358/1.15 |
| 2006/0126111 A1* | 6/2006 | Song ................ | H04N 1/00347 358/1.15 |
| 2007/0245233 A1 | 10/2007 | Kim | |
| 2009/0066991 A1* | 3/2009 | Lee ..................... | H04L 41/0213 358/1.15 |
| 2009/0276439 A1 | 11/2009 | Rosenblatt et al. | |

(Continued)

FOREIGN PATENT DOCUMENTS

EP 2 645 691 A2 10/2013

OTHER PUBLICATIONS

"How to Upgrade, Patch or Clone Xerox Multifunction Devices," *Xerox Multifunction Devices: Customer Tips . . . for the user*, dc06cc0410, Xerox, Jan. 27, 2009, pp. 1-10.

(Continued)

*Primary Examiner* — Ngon Nguyen
(74) *Attorney, Agent, or Firm* — Staas & Halsey LLP

(57) ABSTRACT

An image forming device and a mobile device are provided. The image forming device includes a file generating unit, which generates a cloning file including set values of the image forming device; and a wireless communication unit, which transmits the cloning file to a mobile device for cloning another image forming device.

25 Claims, 22 Drawing Sheets

(56) References Cited

U.S. PATENT DOCUMENTS

2011/0231922 A1\* 9/2011 Azuma .................. G06F 21/35
   726/9
2012/0033248 A1 2/2012 Farrell

OTHER PUBLICATIONS

Extended European Search Report mailed Oct. 20, 2015 in European Patent Application No. 15162289.1.

\* cited by examiner

FIG. 13
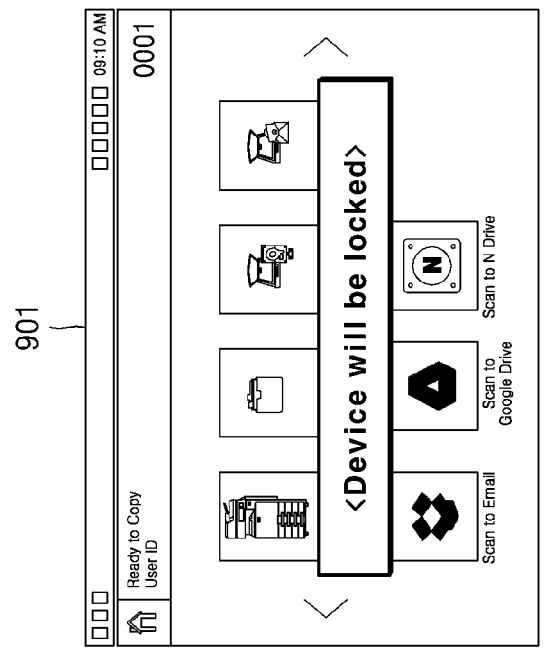
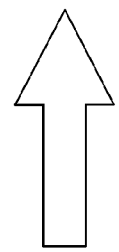
WHEN CLONING FILE IS GENERATED
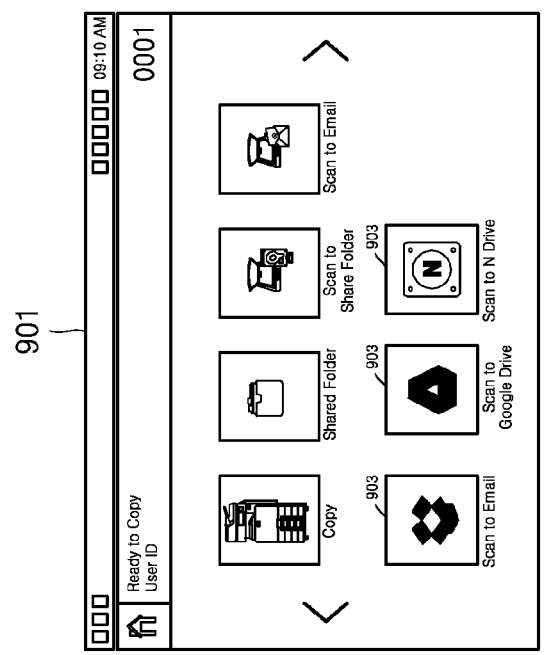

FIG. 16

```xml
<?xml version="1.0" encoding="UTF-8"?>
<cloning modelname="SL-M4070FW">
<generateddate>2013-10-18T14:41:05</generateddate>
<machinesetting>
    <machinesettingsystem>1</machinesettingsystem>
    <machinesettingprinter>20</machinesettingprinter>
    <machinesettingcopy>48</machinesettingcopy>
    <machinesettingfax>86</machinesettingfax>
...
```

FIG. 17

```
<machinesettingsystem>
    <systemlanguage>18</systemlanguage>
    <systemlowpowersave>10</systemlowpowersave>
    <systempowersave>5</systempowersave>
    <systemwakeupall>0</systemwakeupall>
    <systemsystemtimeoutenabledisable>1</systemsystemtimeoutenabledisable>
    <systemsystemtimeoutenabledisable>1</systemsystemtimeoutenabledisable>
    <systemsystemtimeoutvalue>180</systemsystemtimeoutvalue>
    <systemheldjobtimeoutenabledisable>0</systemheldjobtimeoutenabledisable>
    <systemheldjobtimeoutvalue>4320</systemheldjobtimeoutvalue>
    <systemautopowerofftimeoutenabledisable>0</systemautopowerofftimeoutenabledisable>
    <systemautopowerofftimeout>0</systemautopowerofftimeout>
    <systemjobtimeout>15</systemjobtimeout>
```

IMAGE FORMING APPARATUS AND METHOD OF CLONING USING MOBILE DEVICE

CROSS-REFERENCE TO RELATED APPLICATIONS

This application is related to, and claims the priority benefit of, Korean Patent Application No. 10-2014-0039358, filed on Apr. 2, 2014, in the Korean Intellectual Property Office, the disclosure of which is incorporated herein in its entirety by reference.

BACKGROUND

1. Field

One or more embodiments relate to an image forming device and a method of performing a cloning process.

2. Description of the Related Art

Near field communication (NFC) is a close-distance wireless communication standard enabling wireless communication between electronic devices within 10 cm range using 13.56 MHz frequency.

To perform a wireless communication using NFC, a NFC tag and a NFC reader may be needed. A NFC tag may include data, and a NFC reader may read out data included in a NFC tag.

A process of updating two or more image forming devices to same set values may be referred to as cloning. It may be necessary to update set values of other image forming devices to be identical to set values of an image forming device by performing a cloning process.

SUMMARY

One or more embodiments include a method of cloning image forming devices.

One or more embodiments include a non-transitory computer-readable recording medium having recorded thereon a computer program for implementing the method.

Additional aspects will be set forth in part in the description which follows and, in part, will be apparent from the description, or may be learned by practice of the presented embodiments.

According to one or more embodiments, an image forming device includes a file generating unit, which generates a cloning file including set values of the image forming device; and a wireless communication unit, which transmits the cloning file to a mobile device for cloning another image forming device.

The file generating unit generates the cloning file in the XML format.

The file generating unit generates an encrypted cloning file by using an encryption key input by a user.

The wireless communication unit performs an authentication by using an ID and a password input by a user, and the cloning file is transmitted to the mobile device only when the authentication is successful.

The image forming device includes a NFC tag including data for a wireless communication with the mobile device.

The file generating unit generates capability information indicating functions supported by the image forming device, and the wireless communication unit transmits the capability information to the mobile device.

The wireless communication unit receives data indicating which of the functions included in the capability information is selected by the user, and the file generating unit generates a cloning file including set values regarding the selected functions.

According to one or more embodiments, an image forming device including a wireless communication unit, which receives a data file from a mobile device; and an update unit, which analyzes the data file and performs a cloning process.

The data file is a cloning file generated by another image forming device.

The cloning file is generated in the XML format.

The data file is print data including a printing task.

The update unit extracts set values included in the print data by parsing the print data and performs a cloning process by updating set values of the image forming device to the extracted set values.

The data file is a file encrypted by using an encryption key input by a user.

The update unit decrypts the encrypted data file by using an encryption key input by a user and performs a cloning process by updating set values of the image forming device to set values included in the decrypted data file.

The update unit performs an authentication by using an ID and a password input by a user and receives the data file from the mobile device only when the authentication is successful.

The image forming device includes a NFC tag for a wireless communication with the mobile device.

According to one or more embodiments, a mobile device including a cloning file processing unit, which sets to export or import of a cloning file; and a wireless communication unit, which receives a cloning file from a first image forming device when it is set to export and transmits the cloning file to a second image forming device when it is set to import.

The cloning file is generated by the first image forming device in the XML format.

The wireless communication unit receives capability information indicating functions supported by the first image forming device, and the cloning file processing unit transmits data indicating functions selected from among the functions by a user to the first image forming device.

The wireless communication unit performs authentications with the first and second image forming devices by using an ID and a password input by a user and transmits and receives the cloning file only when the authentications are successful.

The mobile device further includes a NFC reader for reading NFC tags attached to the first and second image forming devices.

According to one or more embodiments, a mobile device includes a cloning file processing unit, which sets to export or import of a cloning file; and a wireless communication unit, which transmits print data to an image forming device when it is set to import, wherein the wireless communication unit receives a cloning file generated by the image forming device when it is set to import.

The print data is generated in the printer job language (PJL) format.

The cloning file processing unit extracts set values included in the print data, and the wireless communication unit transmits the extracted set values to the image forming device.

The image forming device further includes a NFC reader for reading a NFC tag attached to the image forming device.

The cloning file is generated by using set values included in the print data.

BRIEF DESCRIPTION OF THE DRAWINGS

These and/or other aspects will become apparent and more readily appreciated from the following description of the embodiments, taken in conjunction with the accompanying drawings in which:

FIG. 13 illustrates an exemplary display on a display unit when a cloning file is generated by an image forming device;

FIG. 16 illustrates exemplary capability information regarding an image forming device;

FIG. 17 illustrates a cloning file according to an embodiment;

DETAILED DESCRIPTION

Figure 1:
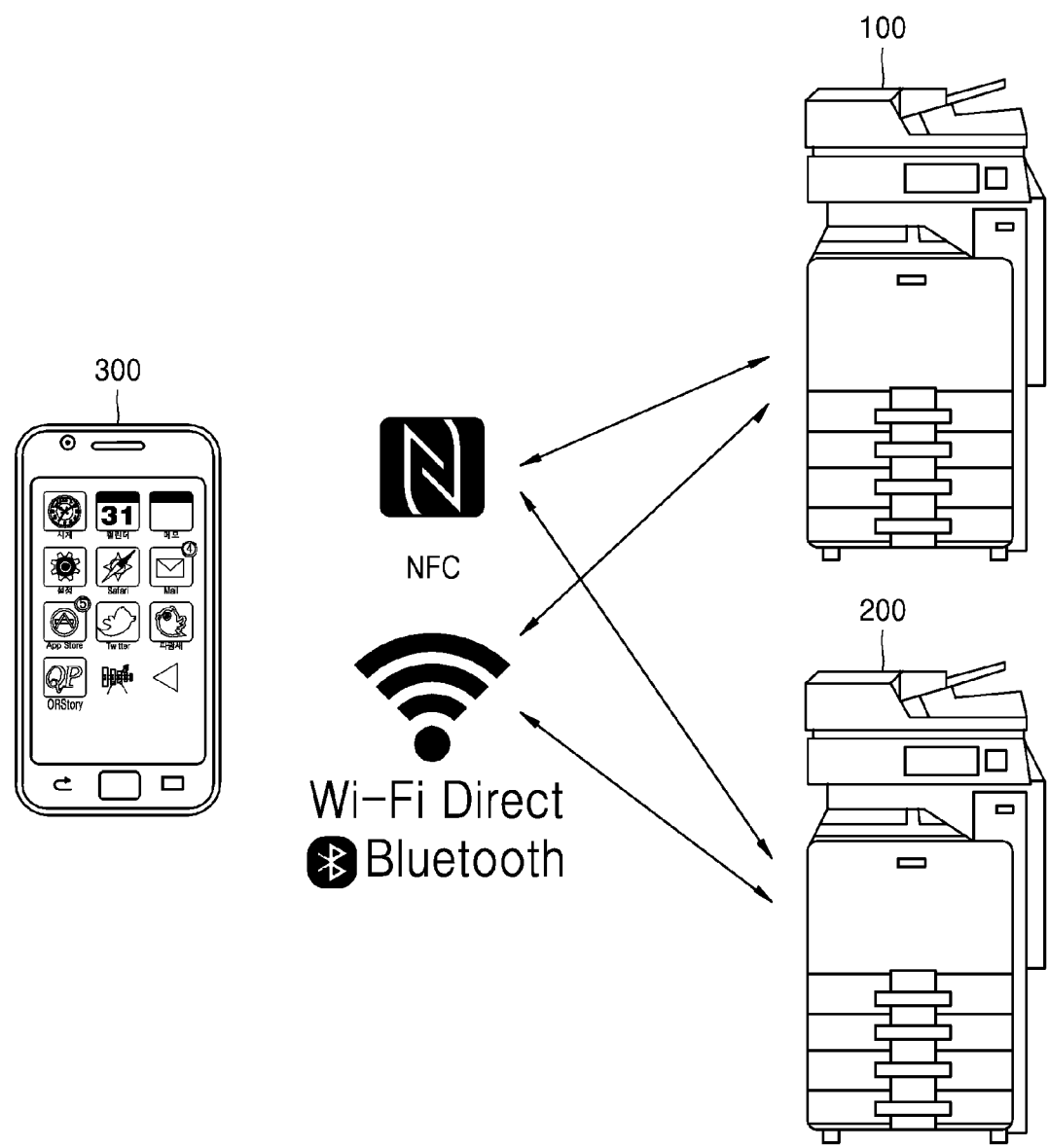
FIG. 1 illustrates a cloning process according to an embodiment.

Example exemplary embodiments are illustrated in the drawings and described in detail in the written description. However, this is not intended to limit the present invention to particular modes of practice, and it is to be appreciated that changes, equivalents, and substitutes that do not depart from the spirit and technical scope are encompassed in the present invention.

While such terms as "first," "second," etc., may be used to describe and distinguish various components, such components are not limited to the terms.

The terms used are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Embodiments of the invention are described in detail with reference to the accompanying drawings. Those components that are the same or are in correspondence are rendered the same reference numeral regardless of the figure number.

FIG. 1 illustrates a cloning process according to an embodiment. Referring to FIG. 1, a mobile device 300 clones a first image forming device 100 and a second image forming device 200. A process for making the first image forming device 100 and the second image forming device 200 to have same set values when set values of the first image forming device 100 are not identical to set values of the second image forming device 200 may be referred to as a cloning process.

Set values of the second image forming device 200 may be updated based on set values of the first image forming device 100 or set values of the first image forming device 100 may be updated based on set values of the second image forming device 200.

The mobile device 300 may be connected to the first and second image forming devices 100 and 200 via a wireless connection. The mobile device 300 and the first and second image forming devices 100 and 200 may exchange data wirelessly by using, for example, Wi-Fi or Bluetooth.

The mobile device 300 may obtain information necessary for using Wi-Fi or Bluetooth via a NFC communication. When the mobile device 300 is tagged to the first image forming device 100 or the second image forming device 200, a NFC reader of the mobile device 300 may read out data stored in a NFC tag of the first image forming device 100 or the second image forming device 200. A NFC tag stores data related to wireless communication setting of the first image forming device 100 or the second image forming device 200. For example, a NFC tag may store an address or a password for Wi-Fi or Bluetooth connection. The mobile device 300 attempts a wireless connection to the first and second image forming devices 100 and 200 by using the address or the password.

The mobile device 300 transmits and receives a cloning file. The mobile device 300 receives a cloning file from the first image forming device 100 via a wireless communication. The mobile device 300 transmits the received cloning file to the second image forming device 200 via a wireless communication. The second image forming device 200 performs a cloning process by updating set values by using the received cloning file. Set values of the second image forming device 200 are updated to be identical to set values of the first image forming device 100, and thus the first and second image forming devices 100 and 200 are cloned.

Figure 2:
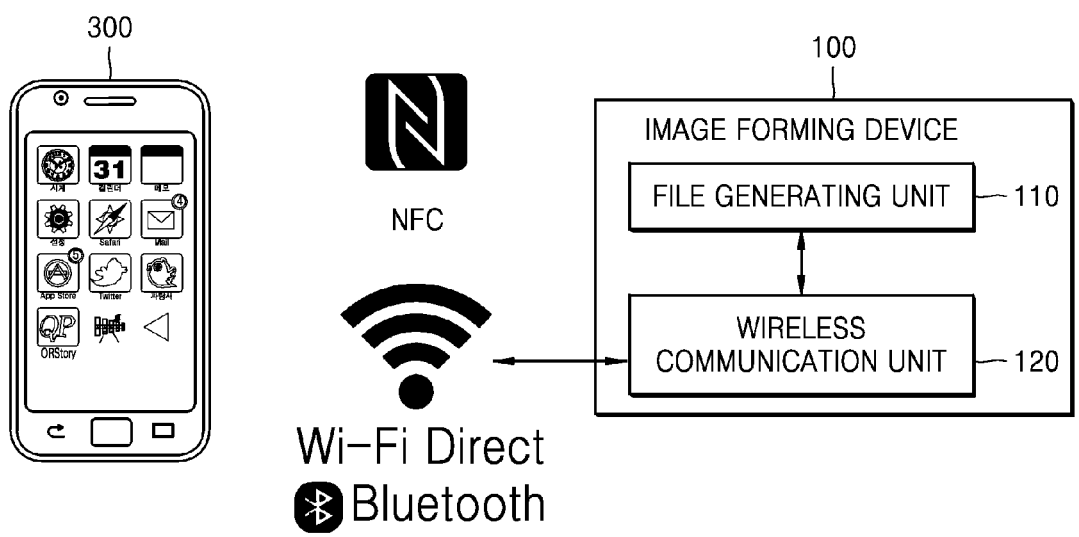
FIG. 2 illustrates an exemplary image forming device that generates a cloning file and transmits the cloning file to a mobile device.

FIG. 2 illustrates an image forming device that generates a cloning file and transmits the cloning file to a mobile device. Referring to FIG. 2, the image forming device 100 includes a file generating unit 110 including a processor that generates the cloning file and a wireless communication unit 120 including a transmitter that transmits the cloning file.

The file generating unit 110 generates a cloning file. The image forming device 100 generates a cloning file including set values. The set values refer to information set for the image forming device 100 to print out data. For example, set values may include values indicating a language, a print paper, colors, a printing direction, and duplex printing.

The file generating unit 110 generates a cloning file in the extensible markup language (XML) format. The XML includes common texts and may be easily read. Therefore, the mobile device 300 may receive a cloning file generated in the XML format and extract set values included in the cloning file.

The wireless communication unit 120 may be wirelessly connected to the mobile device 300. The wireless communication unit 120 may be connected to the mobile device 300 via Wi-Fi or Bluetooth. The wireless communication unit 120 may recognize the mobile device 300 attempting to access the image forming device 100 and may allow an access of the mobile device 300. The wireless communication unit 120 may request a password to the mobile device 300 and, if a password received from the mobile device 300 is identical to a password set to the image forming device 100, allows an access of the mobile device 300.

When the mobile device 300 is connected to the wireless communication unit 120, a cloning file generated by the file generating unit 110 may be transmitted to the mobile device 300. The mobile device 300 may perform a cloning process regarding another image forming device by using the received cloning file.

Figure 3:
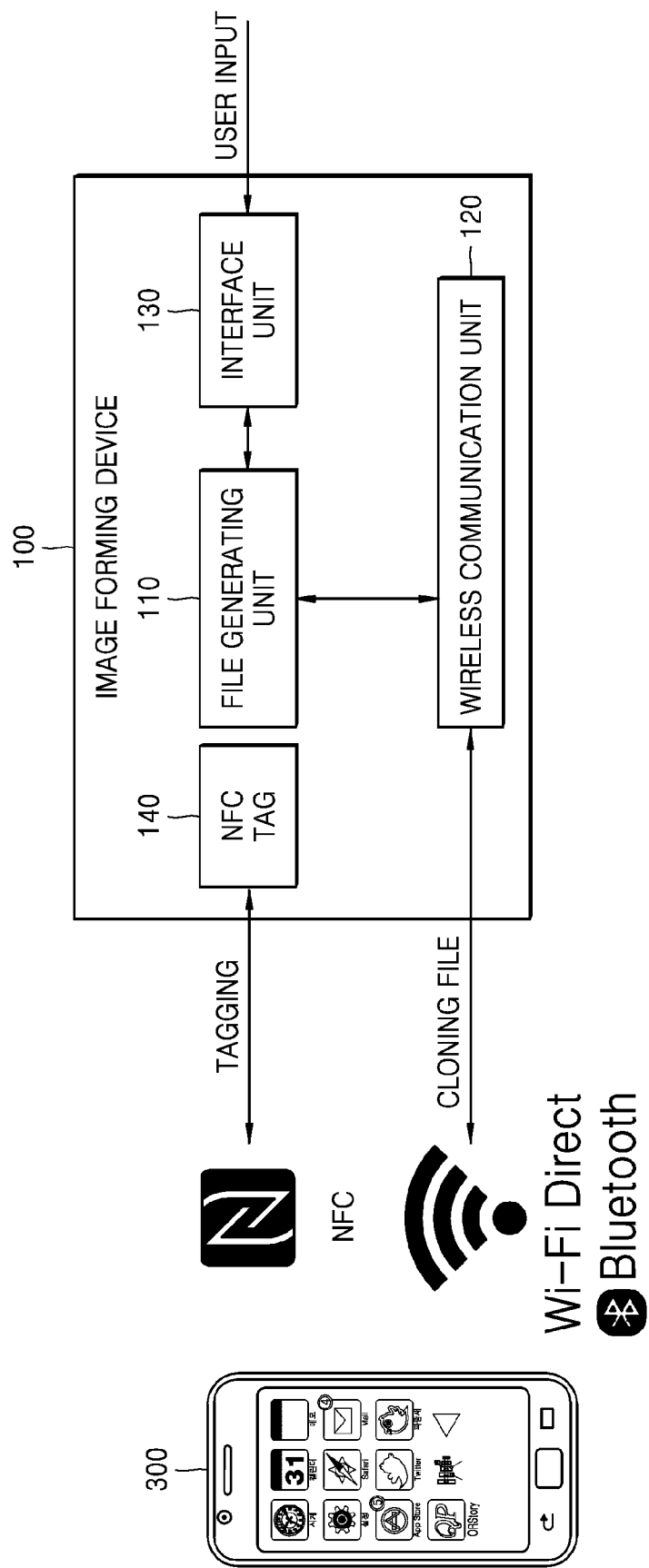
FIG. 3 illustrates an exemplary image forming device that generates an encrypted cloning file and transmits the encrypted cloning file to a mobile device.

FIG. 3 illustrates an image forming device that generates an encrypted cloning file and transmits the encrypted cloning file to a mobile device. Referring to FIG. 3, the image forming device 100 includes an interface unit 130 and a NFC tag 140. The image forming device 100 may encrypt a cloning file by using an encryption key received from a user.

The interface unit 130 is a unit for receiving an instruction from a user. The interface unit 130 may receive an instruction from a user by using a touch panel, a keyboard, a display device, etc. For example, in case of a touch panel, a character or a number may be determined based on a location touched by a user. The interface unit 130 may display a request to input an encryption key to a user and may display a keypad for receiving characters, symbols, or numbers from the user. The interface unit 130 outputs input characters or input numbers to the file generating unit 110.

The image forming device 100 may include a NFC tag 140 and, when a NFC reader of the mobile device 300 is tagged to the NFC tag 140, data stored in the NFC tag 140 is transmitted to the mobile device 300. The NFC tag 140 includes data for a wireless communication with the mobile device 300. The mobile device 300 attempts a Wi-Fi or Bluetooth connection to the image forming device 100 by using received data.

The file generating unit 110 generates an encrypted cloning file. The file generating unit 110 encrypts a cloning file by using an encryption key (characters, symbols, or numbers) received from the interface unit 130.

The wireless communication unit 120 transmits an encrypted cloning file to the mobile device 300 via a wireless communication.

The wireless communication unit 120 performs an authentication by using an ID and a password input by a user and transmits a cloning file to the mobile device 300 only when the authentication is successful. The wireless communication unit 120 may transmit a cloning file only to authenticated devices. An ID and a password of a user may be received from the mobile device 300. The image forming device 100 stores a list of IDs and passwords of access-granted users and determine whether an ID and a password received from the mobile device 300 match to information in the list. The wireless communication unit 120 may determine whether to transmit a cloning file based on whether an ID and a password match.

The file generating unit 110 may generate a cloning file including only functions selected by a user. The file generating unit 110 generates capability information indicating functions supported by the image forming device 100 and outputs the generated capability information to the wireless communication unit 120. The wireless communication unit 120 transmits the capability information to the mobile device 300. A user may select some of functions by using the mobile device 300. Data including the selected function(s) may be transmitted to the image forming device 100. The file generating unit 110 generates a cloning file including only function(s) selected by the user, and the wireless communication unit 120 transmits the generated cloning file to the mobile device 300. If it is not necessary to generate a cloning file regarding all set values, the image forming device 100 may generate a cloning file including only functions selected by a user. The generated cloning file may be transmitted to another image forming device and is used for cloning the corresponding image forming device. An exemplary configuration in which a user selects a function by using the mobile device 300 is described with reference to FIG. 15.

Figure 4:
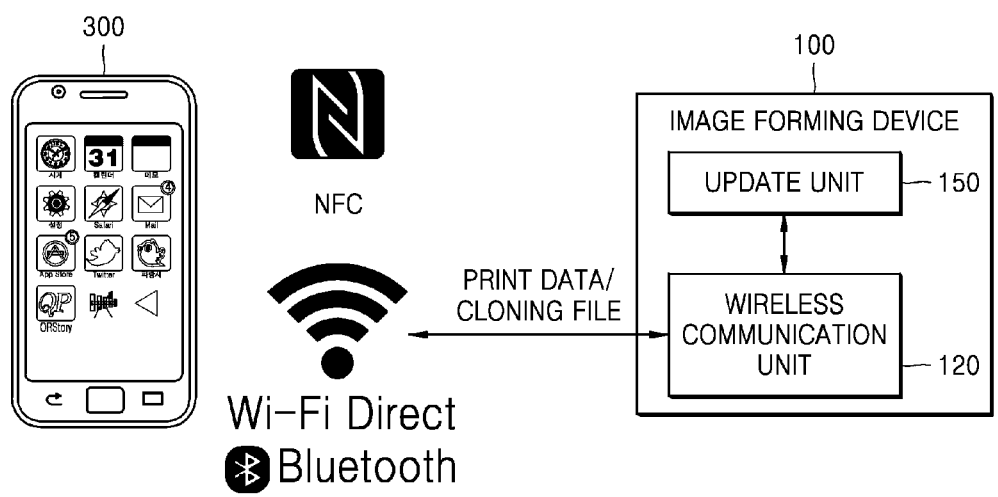
FIG. 4 illustrates an exemplary image forming device that performs a cloning process by using a received cloning file or print data.

FIG. 4 illustrates an image forming device that performs a cloning process by using a received cloning file or print data. Referring to FIG. 4, the image forming device 100 includes an update unit 150. The update unit 150 updates set values of the image forming device 100. The update unit 150 may update set values by using print data or a cloning file.

The update unit 150 may update set values by using print data. The update unit 150 extracts set values included in the print data by parsing the print data and performing a cloning process by updating set values of the image forming device 100 by using the extracted set values. Print data is data indicating a printing task and may include set values for printing and content to be printed. Therefore, the update unit 150 divides print data to set values for printing and contents to be printed and extracts the set values for printing from the print data. Set values for printing may include data indicating a language, a font, a font size, a printing paper, and a printing direction. The update unit 150 updates set values of the image forming device 100 by using the extracted set values. Therefore, the set values of the image forming device 100 may be changed to values identical to the set values for printing included in the print data.

The update unit 150 may update set values by using a cloning file. A cloning file may be generated by the mobile device 300 or another image forming device. Since a cloning file includes set values, the update unit 150 updates set values of the image forming device 100 to the set values included in the cloning file. A cloning file generated by another image forming device may be received by the wireless communication unit 120 via the mobile device 300. Therefore, the image forming device 100 may be set to the same set values as those of the other image forming device by receiving the cloning file wirelessly.

The wireless communication unit 120 includes a receiver that receives print data or a cloning file from the mobile device 300. The wireless communication unit 120 outputs the print data or the cloning file to the update unit 150. A cloning file may be in the XML format, whereas print data may be in the PJL format.

Figure 5:
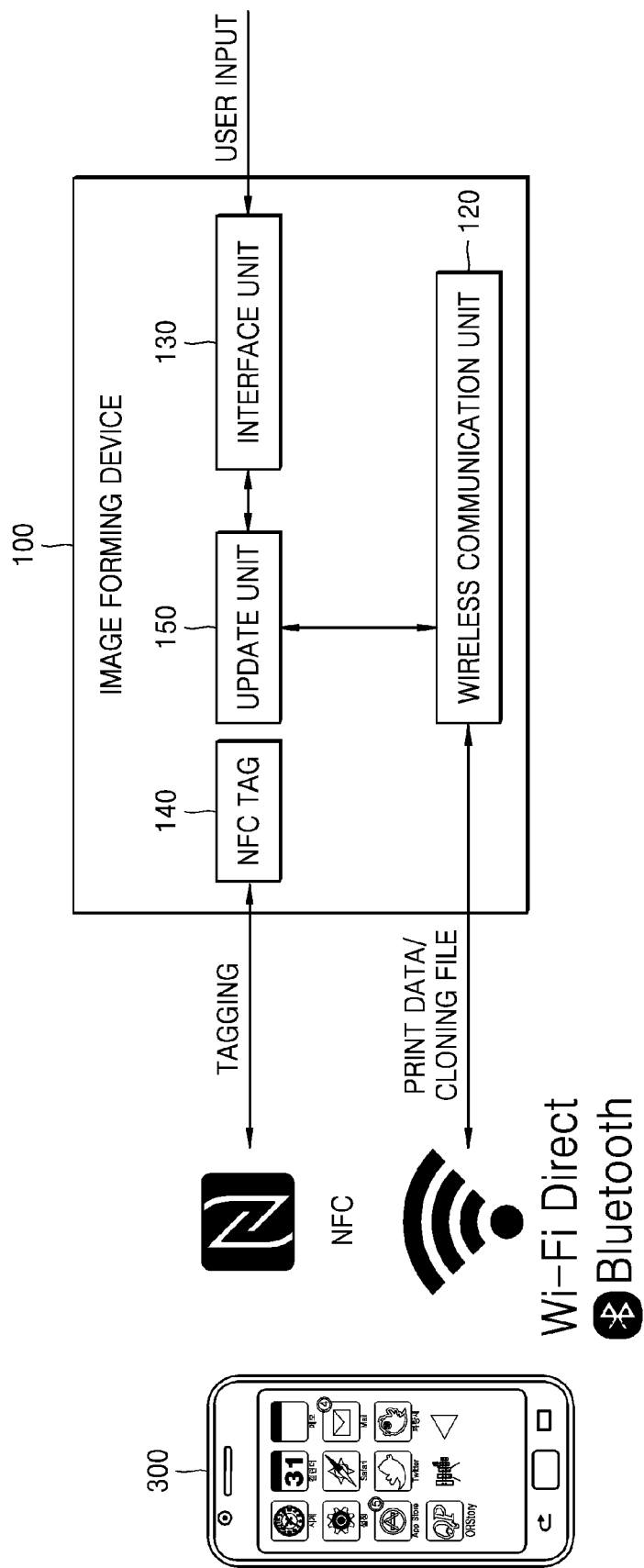
FIG. 5 illustrates an exemplary image forming device that performs a cloning process by decrypting an encrypted data file.

FIG. 5 illustrates an image forming device that performs a cloning process by decrypting an encrypted data file. Referring to FIG. 5, the image forming device 100 includes the interface unit 130 and the NFC tag 140. A method of establishing a wireless communication by using the NFC tag 140 is described above with reference to FIG. 3.

The image forming device 100 may perform a cloning process by using an encrypted print data or a cloning file. The update unit 150 decrypts encrypted print data or an encrypted cloning file, obtains set values included in the print data or the cloning file, and updates set values of the image forming device 100 to the obtained set values. An encryption key for decryption may be input by a user via the interface unit 130. The interface unit 130 may display a request to input an encryption key to a user and may display a keypad for receiving characters, symbols, or numbers from the user. The interface unit 130 outputs input characters or input numbers to the update unit 150.

The update unit 150 decrypts encrypted print data or an encrypted cloning file by using an encryption key input via the interface unit 130. The encryption key may be identical to characters, symbols or numbers used for encrypting the print data or the cloning file.

The update unit 150 updates set values of the image forming device 100 by using the print data or the cloning file. Since the update unit 150 may obtain set values included in the print data or the cloning file after the print data or the cloning file is decrypted, set values of the image forming device 100 may be updated to the obtained set values.

Figure 6:
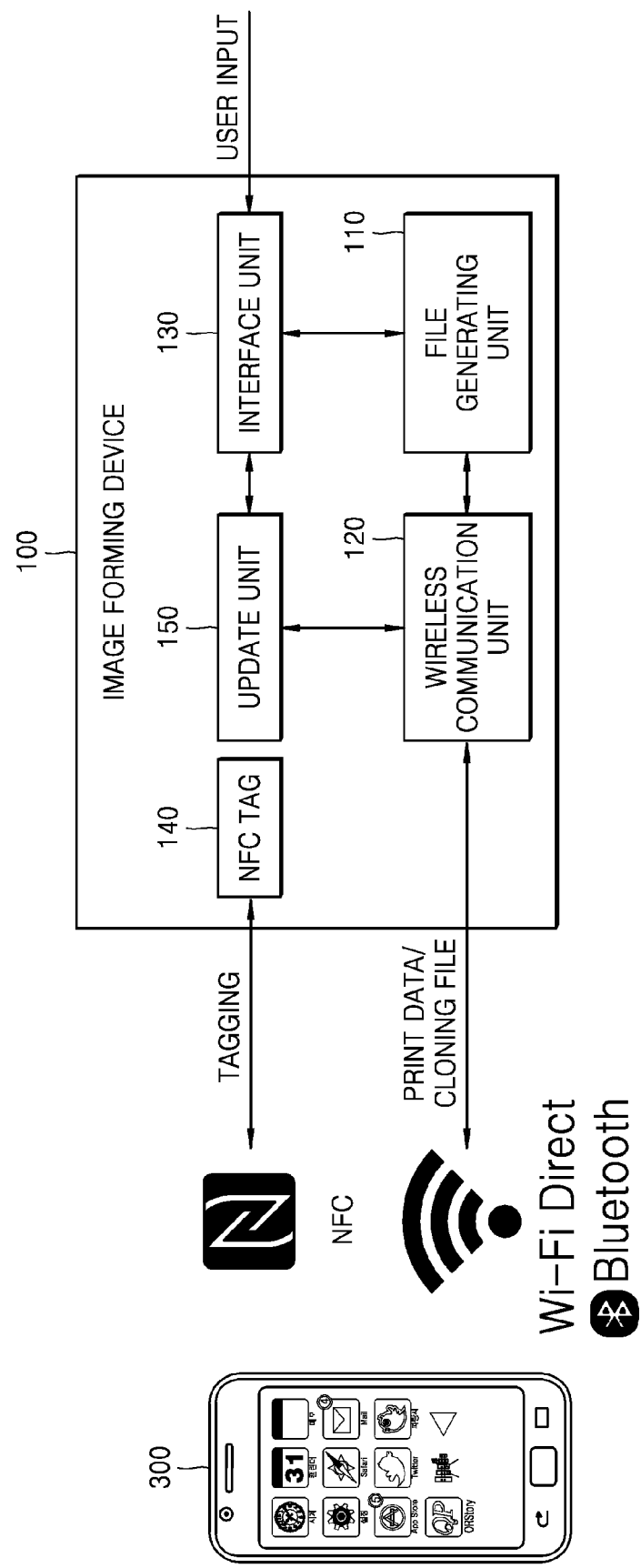
FIG. 6 illustrates an image forming device according to an embodiment that generates a cloning file and performs a cloning process.

FIG. 6 illustrates an image forming device according to an embodiment that generates a cloning file and performs a cloning process. Although FIGS. 2 through 5 illustrate in image forming device 100 for generating a cloning file and the image forming device 100 for performing a cloning process, FIG. 6 illustrate that the image forming device 100 generates a cloning file and performs a cloning process by using a received cloning file. In other words, the image forming device 100 generates a cloning file and transmits the cloning file to the mobile device 300, so that another image forming device may use the cloning file. Furthermore, the image forming device 100 may receive a cloning file generated by another image forming device and perform a cloning process by using the same.

The image forming device 100 may include both the update unit 150 and the file generating unit 110, where the wireless communication unit 120 may transmit a cloning file generated by the file generating unit 110 to the mobile device 300. Furthermore, the update unit 150 may perform a cloning process by using a cloning file received via the wireless communication unit 120. Accordingly, the image forming device 100 may generate a cloning file or update set values by using a received cloning file.

The image forming device 100 may import or export a cloning file according to a request of the mobile device 300. When the mobile device 300 requests an export to the image forming device 100, the image forming device 100 generates a cloning file and transmits the generated cloning file to the mobile device 300. Furthermore, when the mobile device 300 requests an import to the image forming device 100, the image forming device 100 receives a cloning file and performs a cloning process by using the same.

The image forming device 100 and the mobile device 300 may perform an import process or an export process after a mutual authentication succeeds and may encrypt or decrypt a cloning file.

Figure 7:
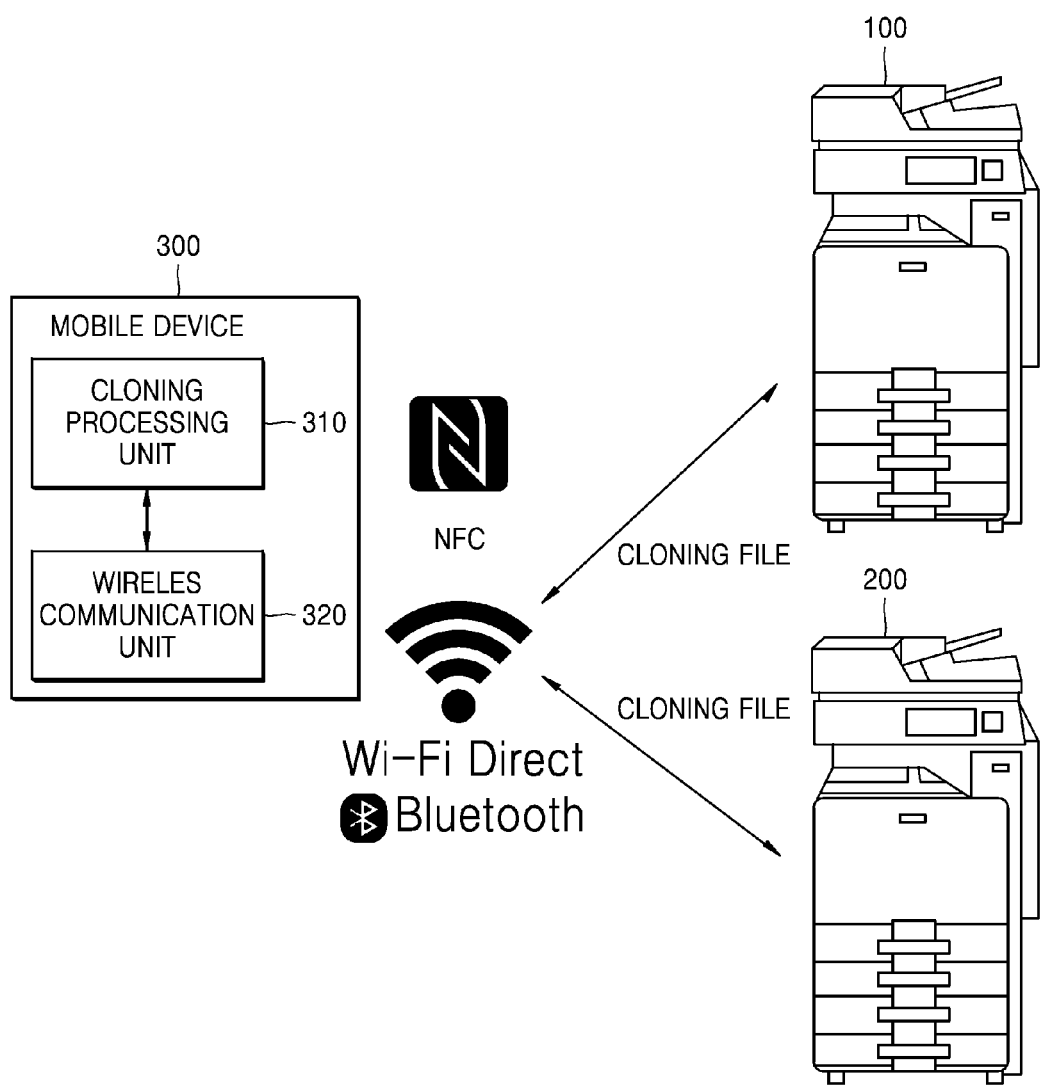
FIG. 7 illustrates a mobile device for performing a cloning process regarding image forming devices, according to an embodiment.

FIG. 7 illustrates a mobile device for performing a cloning process regarding image forming devices, according to an embodiment. Referring to FIG. 7, the mobile device 300 includes a cloning processing unit 310 and a wireless communication unit 320.

The cloning processing unit 310 sets up export and import of a cloning file. The mobile device 300 may receive an input from a user and determine to export or to import. In other words, a user may determine to export or to import by operating the mobile device 300. An exporting process is a process for receiving a cloning file from image forming devices 100 and 200, whereas an importing process is a process for transmitting a cloning file to the image forming devices 100 and 200.

The wireless communication unit 320 transmits and receives a cloning file based on a user selection. When it is set to export, the wireless communication unit 320 receives a cloning file from the first image forming device 100. When it is set to import, the wireless communication unit 320 transmits a cloning file to the second image forming device 200. A cloning file may be generated by the first image forming device 100 in the XML format.

The mobile device 300 may perform a cloning process regarding the first image forming device 100 or the second image forming device 200 by using print data. In other words, the mobile device 300 makes set values of the first image forming device 100 or the second image forming device 200 identical to set values included in the print data.

The cloning processing unit 310 extracts set values included in print data. The cloning processing unit 310 extracts set values included in print data by parsing the print data and generates a cloning file including the extracted set values. Print data is data indicating a printing task and may include set values for printing and content to be printed. Print data may be generated in the printer job language (PJL) format. The cloning processing unit 310 divides print data to set values for printing and contents to be printed and extracts the set values for printing from the print data. Set values for printing may include data indicating, for example, a language, a font, a font size, a printing paper, and a printing direction.

The wireless communication unit 320 transmits cloning file generated by using print data to the first image forming device 100 or the second image forming device 200. Therefore, the first image forming device 100 of the second image forming device 200 may perform a cloning process by using set values included in the cloning file.

Figure 8:
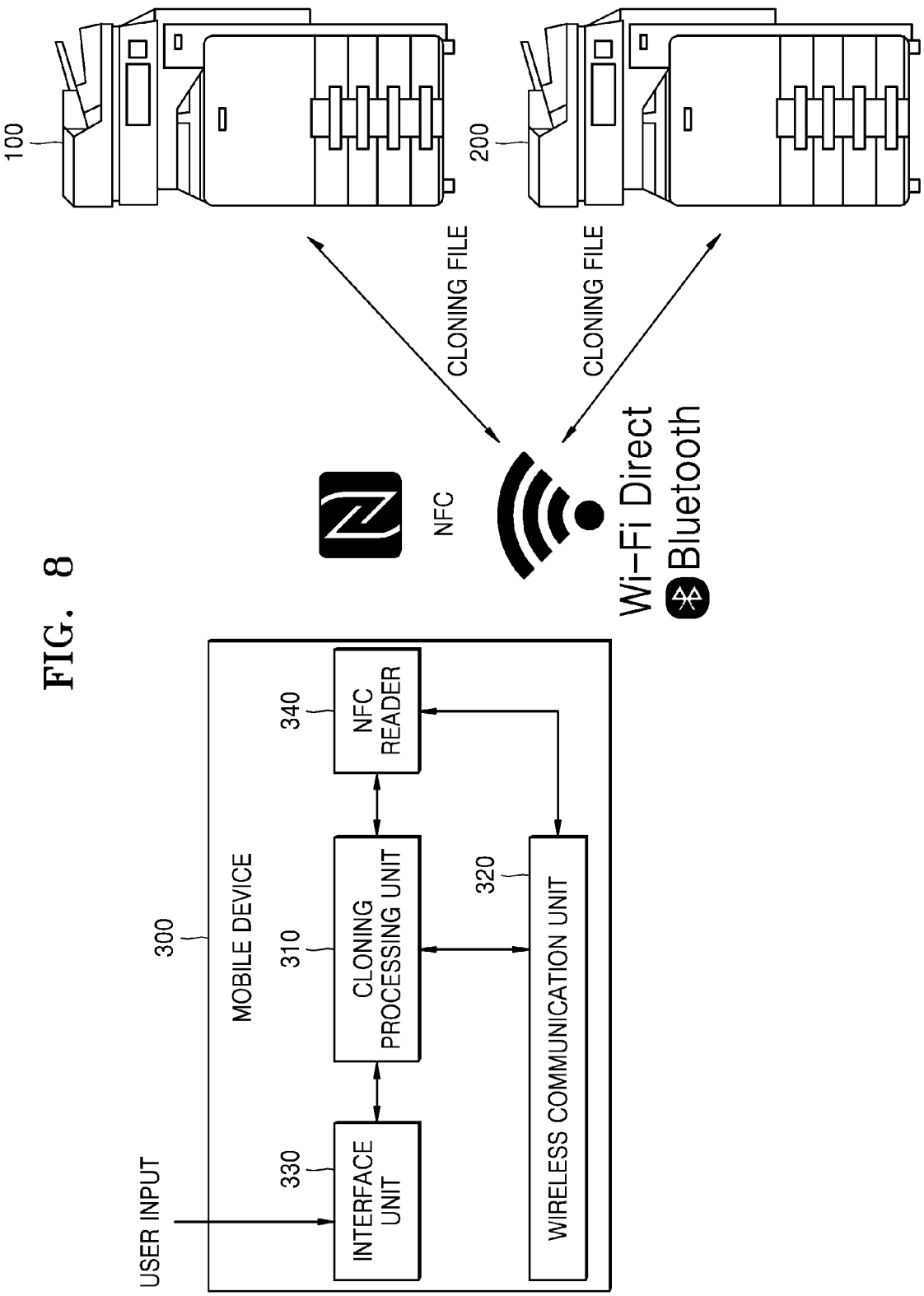
FIG. 8 illustrates a mobile device for cloning image forming devices according to an embodiment.

FIG. 8 illustrates a mobile device for cloning image forming devices according to an embodiment. Referring to FIG. 8, the mobile device 300 includes an interface unit 330 and a NFC reader 340.

The interface unit 330 is a unit for receiving an instruction from a user. The interface unit 330 may receive an instruction from a user by using a touch panel, a keyboard, a display device, etc. For example, in a touch panel, a character or a number may be determined based on a location touched by a user. The interface unit 330 may display a request to input an encryption key to a user and may display a keypad for receiving characters, symbols, or numbers from the user. The interface unit 330 outputs input characters or input numbers to the cloning processing unit 310. The cloning processing unit 310 may encrypt a cloning file or decrypt an encrypted cloning file.

The mobile device 300 may receive, for example, a cloning file regarding only some of functions of the image forming device 100. The mobile device 300 receives capability information indicating functions supported by the image forming device 100 via the wireless communication unit 320. The interface unit 330 displays functions supported by the image forming device 100 in a user-recognizable form. The interface unit 330 outputs a function selected from among displayed functions by a user to the cloning processing unit 310. The wireless communication unit 320 transmits data indicating the selected function to the image forming device 100 and receives a cloning file regarding the selected function from the image forming device 100.

The mobile device 300 includes a NFC reader for reading NFC tags attached to the first and second image forming devices 100 and 200. The mobile device 300 may read out data stored in NFC tags via the NFC reader 340 by being tagged to the image forming device 100. The NFC reader 340 outputs read out data to the wireless communication unit 320. The wireless communication unit 320 attempts a wireless connection to the first image forming device 100 or the second image forming device 200.

The wireless communication unit 320 may perform authentications with the first and second image forming devices 100 and 200 by using an ID and a password input by a user via the interface unit 330. When the first image forming device 100 or the second image forming device 200 requests a user authentication, the wireless communication unit 320 instructs to display a screen image by which a user may input an ID and a password via the interface unit 330. The wireless communication unit 320 may perform an authentication by transmitting an ID and a password input by a user via the interface unit 330 to the first image forming device 100 or the second image forming device 200. The mobile device 300 may transmit and receive a cloning file to and from the first image forming device 100 or the second image forming device 200 only when an authentication is successful.

Figure 9:
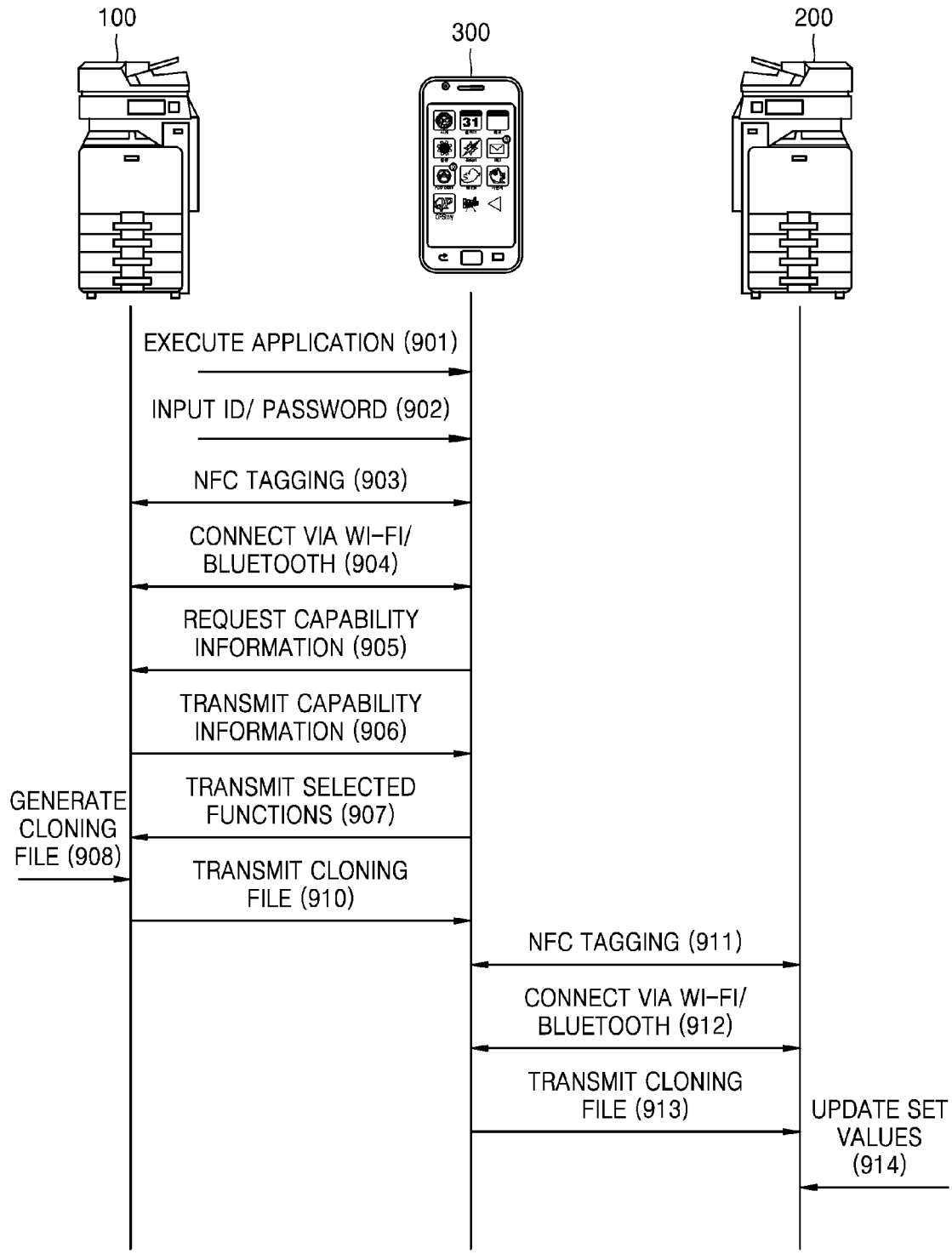
FIG. 9 illustrates a cloning method according to an embodiment.

FIG. 9 illustrates a cloning method according to an embodiment. Referring to FIG. 9, the mobile device 300 executes an application for performing a cloning process in operation 901. When the application is executed, a screen image for selecting to export or to import is displayed on a display unit of the mobile device 300. When a user selects to export, the mobile device 300 initiates an exporting process.

An application may be automatically executed as the mobile device 300 is tagged to the first image forming device 100. For example, if the NFC tag of the first image forming device 100 includes information regarding an application, when the mobile device 300 is tagged to the first image forming device 100, the NFC reader of the mobile device 300 may read out the information regarding an application stored in the NFC tag of the first image forming device 100 and the mobile device 300 may execute a corresponding application for performing a cloning process.

In operation 902, the mobile device 300 receives an ID and a password from a user. The ID and the password are used for attempting a wireless connection to the first image forming device 100 or the second image forming device 200.

In operation 903, the mobile device 300 is tagged to the first image forming device 100. A user may tag the mobile device 300 to the first image forming device 100 by contacting the mobile device 300 to a location of the first image forming device 100 having attached thereon the NFC tag. When the mobile device 300 is tagged to the first image forming device 100, the NFC reader of the mobile device 300 reads out data stored in the NFC tag of the first image forming device 100.

In operation 904, the mobile device 300 and the first image forming device 100 are wirelessly connected to each other via Wi-Fi or Bluetooth. The mobile device 300 is wirelessly connected to the first image forming device 100 by using data stored in the NFC tag of the first image forming device 100 and an ID and a password.

In operation 905, the mobile device 300 requests capability information to the first image forming device 100. The capability information is information indicating functions supported by the first image forming device 100.

In operation 906, first image forming device 100 transmits capability information to the mobile device 300.

In operation 907, the mobile device 300 transmits selected functions to the first image forming device 100. A user may select, for example, only functions to be cloned from among functions supported by the first image forming device 100 by using the mobile device 300.

In operation 908, the first image forming device 100 generates a cloning file regarding selected functions. In other words, the first image forming device 100 generates a cloning file regarding only functions selected by a user from among functions supported by the first image forming device 100.

In operation 909, the first image forming device 100 transmits the generated cloning file to the mobile device 300.

In operation 910, the mobile device 300 is tagged to the second image forming device 200. A user may tag the mobile device 300 to the second image forming device 200 by contacting the mobile device 300 to a location of the second image forming device 200 having attached thereon the NFC tag. When the mobile device 300 is tagged to the second image forming device 200, the NFC reader of the mobile device 300 reads out data stored in the NFC tag of the second image forming device 200.

In operation 911, the mobile device 300 and the second image forming device 200 are wirelessly connected to each other via Wi-Fi or Bluetooth. The mobile device 300 is wirelessly connected to the second image forming device 200 by using data stored in the NFC tag of the second image forming device 200 and an ID and a password. A screen image for selecting to export or to import is displayed on a display unit of the mobile device 300. When a user selects to import, the mobile device 300 initiates an importing process.

In operation 912, the mobile device 300 transmits a cloning file to the second image forming device 200. The cloning file is a file generated by the first image forming device 100.

In operation 913, the second image forming device 200 updates set values. The second image forming device 200 updates set values of the second image forming device 200 to set values included in the cloning file. As a result, the first and second image forming devices 100 and 200 have the same set values.

Figure 10:
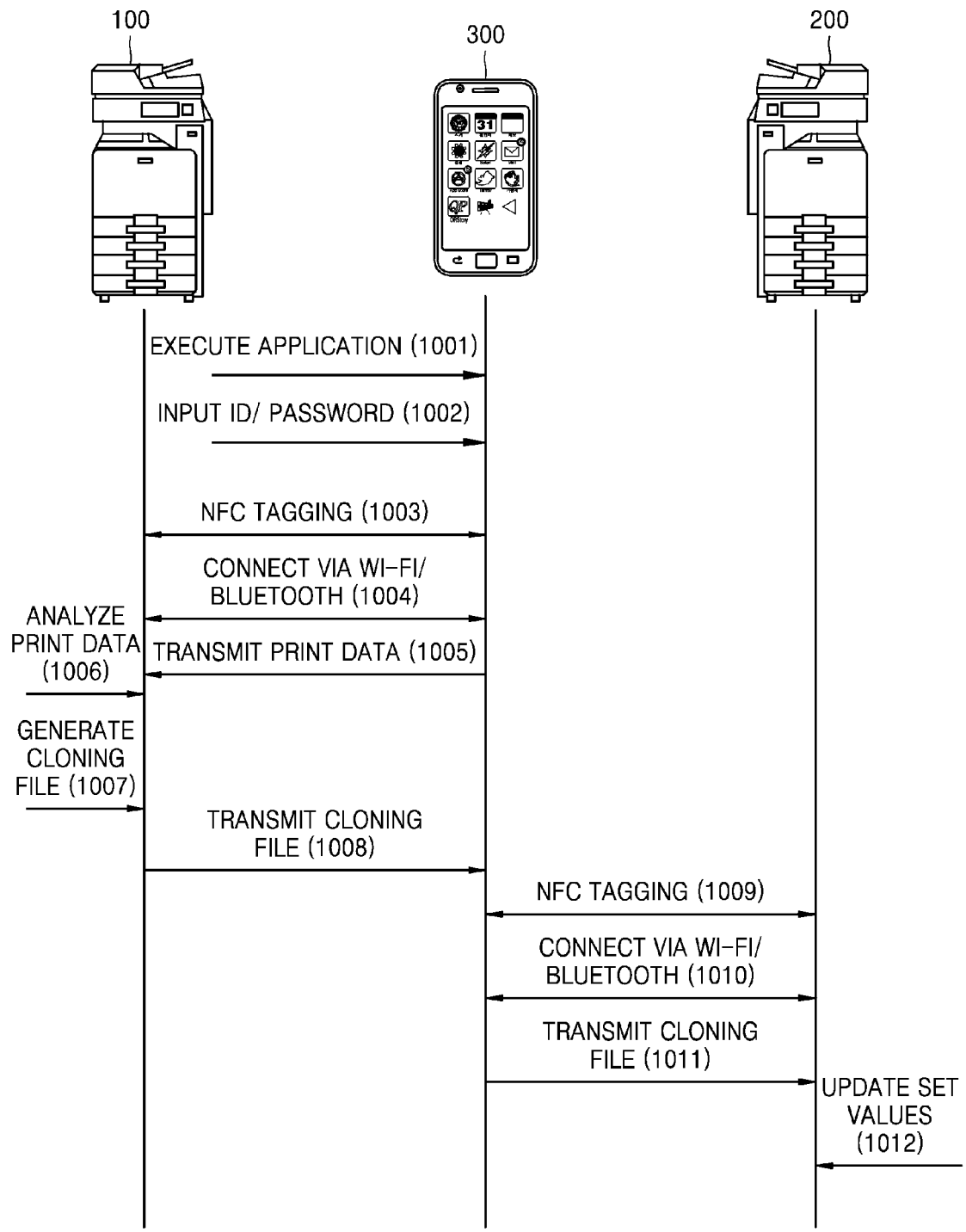
FIG. 10 illustrates a cloning method according to an embodiment.

FIG. 10 illustrates a cloning method according to an embodiment. The descriptions given above with reference to FIG. 9 also apply to the cloning method of FIG. 10. The cloning method illustrated in FIG. 10 is a cloning method using print data.

In operation 1001, the mobile device 300 executes an application for performing a cloning process.

In operation 1002, the mobile device 300 receives an ID and a password from a user. The ID and the password are used to wirelessly connect the mobile device 300 to the first image forming device 100 or the second image forming device 200.

In operation 1003, the mobile device 300 is tagged to the first image forming device 100.

In operation 1004, the mobile device 300 and the first image forming device 100 are wirelessly connected to each other via Wi-Fi or Bluetooth.

In operation 1005, the mobile device 300 transmits print data to the first image forming device 100. Print data is data indicating a printing task and may include set values for printing and content to be printed.

In operation 1006, the first image forming device 100 analyzes the print data. The first image forming device 100 divides the print data to set values for printing and contents to be printed and extracts the set values for printing from the print data. The set values for printing may include data indicating a language, a font, a font size, a printing paper, and a printing direction.

In operation 1007, the first image forming device 100 generates a cloning file. The first image forming device 100 generates a cloning file by using set values included in the print data.

In operation 1008, the first image forming device 100 transmits the cloning file to the mobile device 300. The first image forming device 100 may update set values of the first image forming device 100 based on set values included in the print data. As a result, the first image forming device 100 have set values identical to the set values included in the print data.

In operation 1009, the mobile device 300 is tagged to the second image forming device 200.

In operation 1010, the mobile device 300 and the second image forming device 200 are wirelessly connected to each other via Wi-Fi or Bluetooth.

In operation 1011, the mobile device 300 transmits a cloning file to the second image forming device 200.

In operation 1012, the second image forming device 200 updates set values. The second image forming device 200 updates set values of the second image forming device 200 to set values included in the cloning file. As a result, the second image forming device 200 has set values identical to the set values included in the print data.

Figure 11:
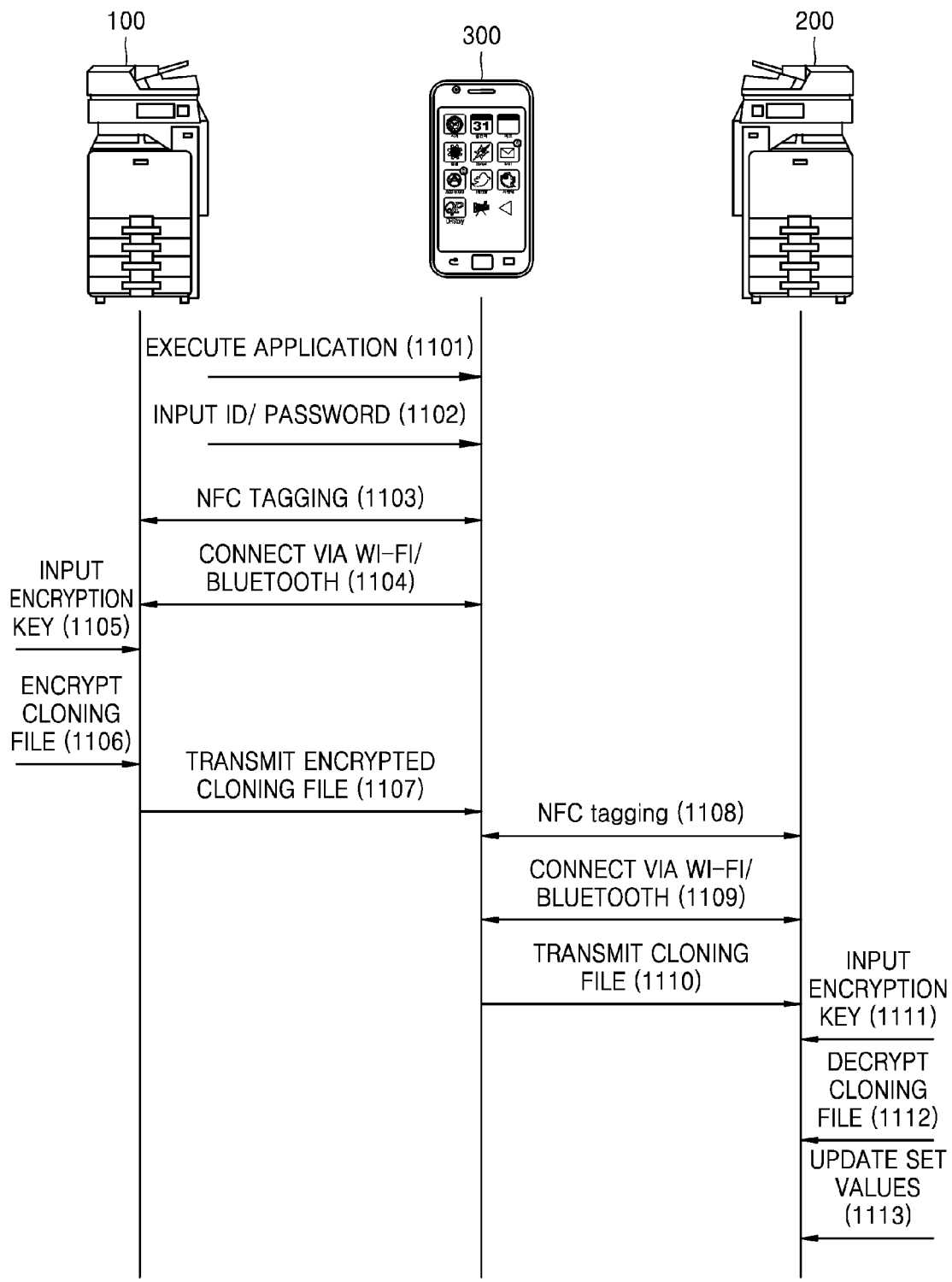
FIG. 11 illustrates a cloning method according to an embodiment.

FIG. 11 illustrates a cloning method according to an embodiment. The descriptions given above with reference to FIG. 9 also apply to the cloning method of FIG. 11. The cloning method illustrated in FIG. 11 is a method for encrypting and decrypting a cloning file.

In operation 1101, the mobile device 300 executes an application for performing a cloning process.

In operation 1102, the mobile device 300 receives an ID and a password from a user. The ID and the password are used to wirelessly connect the mobile device 300 to the first image forming device 100 or the second image forming device 200.

In operation 1103, the mobile device 300 is tagged to the first image forming device 100.

In operation 1104, the mobile device 300 and the first image forming device 100 are wirelessly connected to each other via Wi-Fi or Bluetooth.

In operation 1105, the first image forming device 100 receives a password input by the user. The input password is used as an encryption key.

In operation 1106, the first image forming device 100 generates an encrypted cloning file. The first image forming device 100 encrypts a cloning file by using the encryption key.

In operation 1107, the first image forming device 100 transmits the encrypted cloning file to the mobile device 300.

In operation 1108, the mobile device 300 is tagged to the second image forming device 200.

In operation 1110, the mobile device 300 and the second image forming device 200 are wirelessly connected to each other via Wi-Fi or Bluetooth.

In operation 1111, the second image forming device 200 receives a password input by the user. The input password is used as an encryption key.

In operation 1112, the second image forming device 200 decrypts an encrypted cloning file. The second image forming device 200 decrypts the encrypted cloning file by using the encryption key.

In operation 1113, the second image forming device 200 updates set values.

Figure 12:
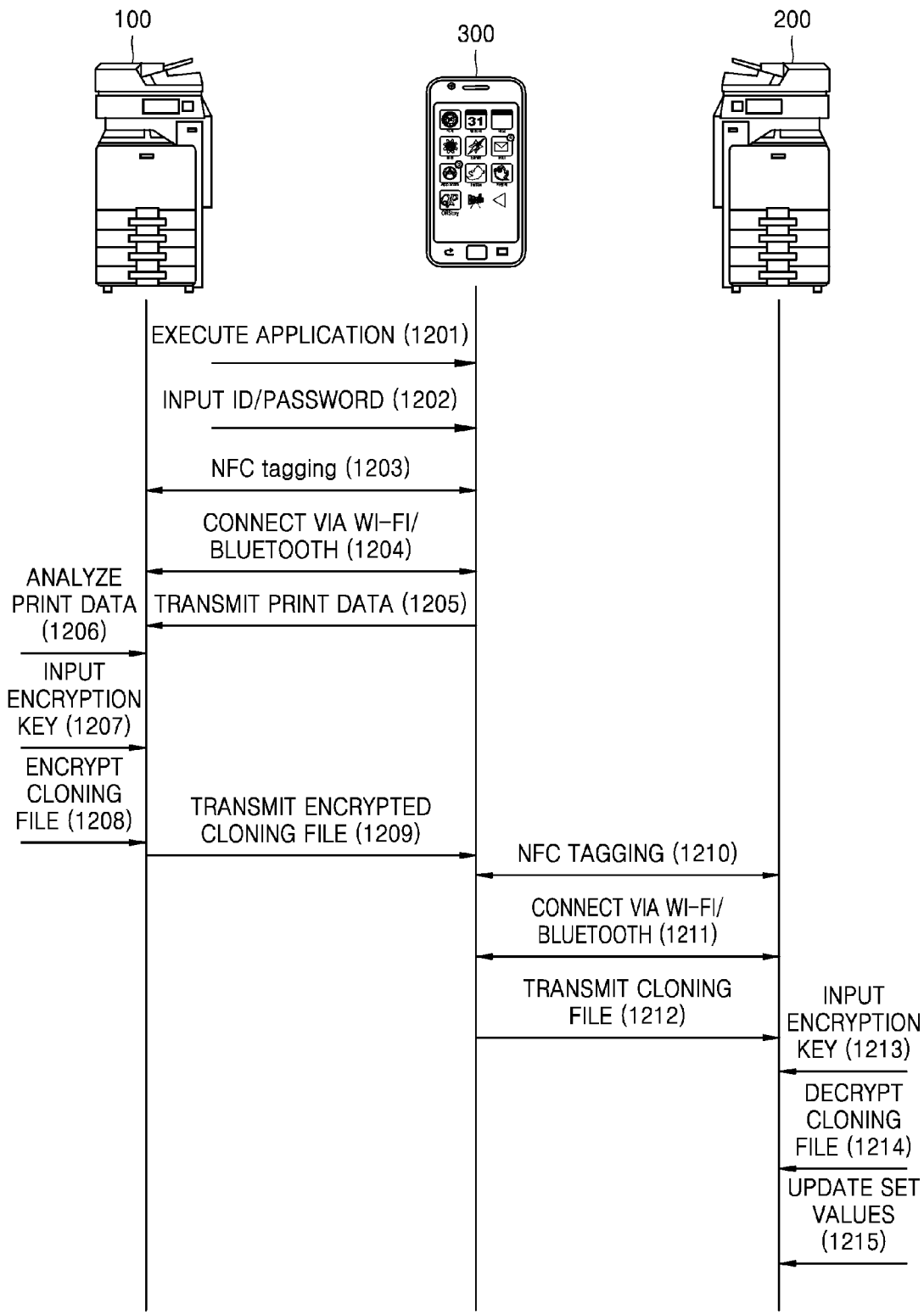
FIG. 12 illustrates a cloning method according to an embodiment.

FIG. 12 illustrates a cloning method according to an embodiment. The descriptions given above with reference to FIG. 9 also apply to the cloning method of FIG. 12. The cloning method illustrated in FIG. 12 is a cloning method using print data and an encrypted cloning file.

In operation 1201, the mobile device 300 executes an application for performing a cloning process.

In operation 1202, the mobile device 300 receives an ID and a password from a user. The ID and the password are used to wirelessly connect the mobile device 300 to the first image forming device 100 or the second image forming device 200.

In operation 1203, the mobile device 300 is tagged to the first image forming device 100.

In operation 1204, the mobile device 300 and the first image forming device 100 are wirelessly connected to each other via Wi-Fi or Bluetooth.

In operation 1205, the mobile device 300 transmits print data to the first image forming device 100.

In operation 1206, the first image forming device 100 analyzes the print data.

In operation 1207, the first image forming device 100 receives a password input by the user. The input password is used as an encryption key.

In operation 1208, the first image forming device 100 generates an encrypted cloning file by using the encryption key.

In operation 1209, the first image forming device 100 transmits the encrypted cloning file to the mobile device 300.

In operation 1210, the mobile device 300 is tagged to the second image forming device 200.

In operation 1211, the mobile device 300 and the second image forming device 200 are wirelessly connected to each other via Wi-Fi or Bluetooth.

In operation 1212, the mobile device 300 transmits the encrypted cloning file to the second image forming device 200.

In operation 1213, the second image forming device 200 receives a password input by the user. The input password is used as an encryption key.

In operation 1214, the second image forming device 200 decrypts the encrypted cloning file by using the encryption key.

In operation 1215, the second image forming device 200 updates set values.

FIG. 13 illustrates an exemplary display on a display unit when a cloning file is generated by an image forming device. FIG. 13 illustrates a display unit of the image forming device 100. The image forming device 100 displays icons indicating functions supported by the first image forming device 100 when the image forming device 100 does not generate a cloning file. When the image forming device 100 generates a cloning file, the image forming device 100 displays a message prohibiting operation of the image forming device 100 to prevent a user from operating the image forming device 100. FIG. 13 illustrates an example message "device will be locked." When a message prohibiting operation is displayed on a display unit of the image forming device 100, even if a user input, such as a touch, is detected, the image forming device 100 does not perform operation corresponding to the touch of the user.

FIGS. 14A through 14F illustrate an exemplary cloning process.

Figure 14A:
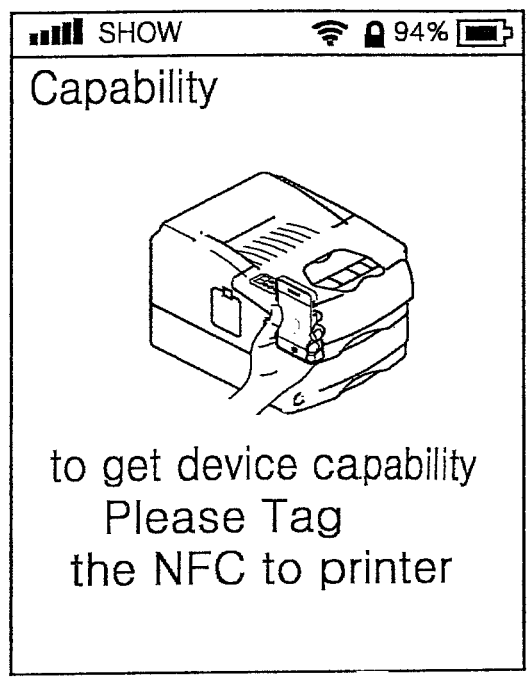
FIGS. 14A through 14F illustrates an exemplary cloning process.

FIG. 14A illustrates that a user tags the mobile device 300 to the first image forming device 100. The user attempts a wireless connection between the first image forming device 100 and the mobile device 300 by tagging the mobile device 300 to a location of the first image forming device 100 having attached thereon a NFC tag.

Figure 14B:
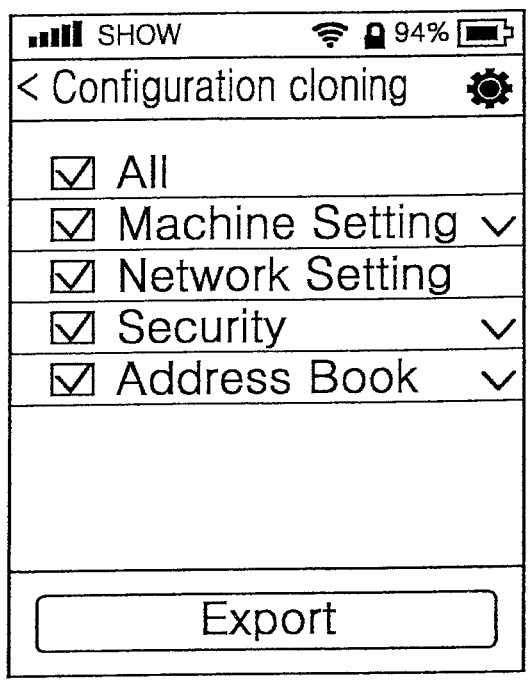

FIG. 14B illustrates in exemplary display at the mobile device 300. The mobile device 300 displays capability information received form the first image forming device 100. A user may select some of, or all of, the functions included in the capability information. In FIG. 14B, the mobile device 300 displays functions supported by the first image forming device 100 including Machine Setting, Network Setting, Security, and Address Book. When a user selects some of or all of Machine Setting, Network Setting, Security, and Address Book and an Export button displayed at the bottom is clicked, the mobile device 300 may transmit functions selected by the user to the first image forming device 100.

Figure 14C:
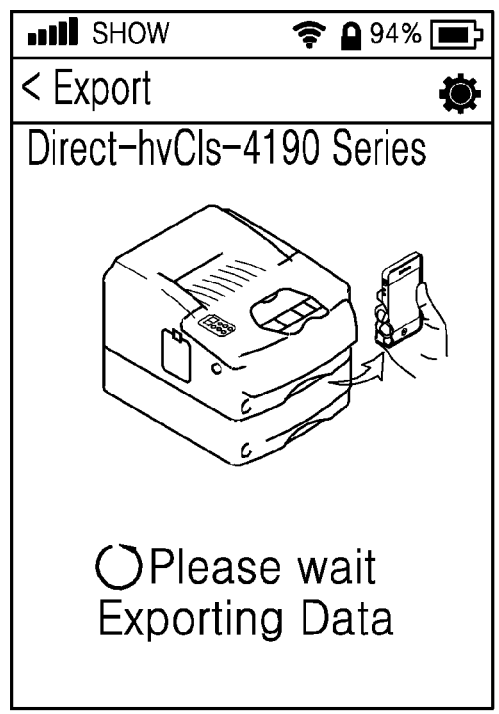

FIG. 14C illustrates that the first image forming device 100 transmits a cloning file to the mobile device 300.

The first image forming device 100 generates a cloning file including functions selected by a user and transmits the cloning file to the mobile device 300.

Figure 14D:
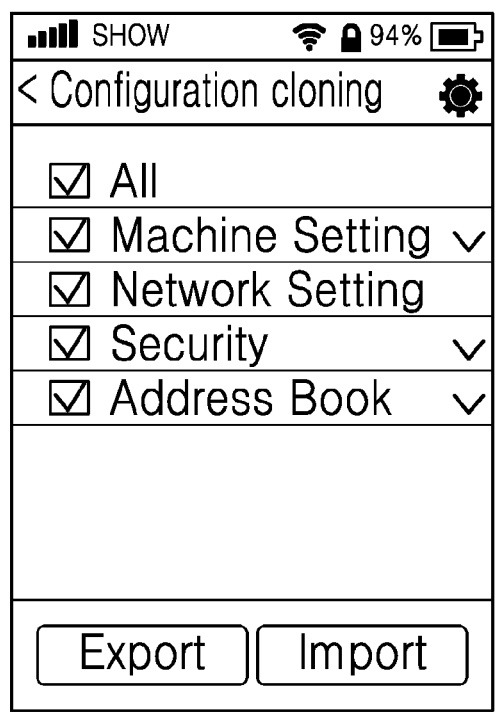

FIG. 14D illustrates the mobile device 300 displaying a cloning file received from the first image forming device 100. The mobile device 300 displays the cloning file received from the first image forming device 100 in a user-recognizable form. A user may select a function to import from among the displayed functions. Furthermore, the user may click an Import button at the bottom of the mobile device 300. When the mobile device 300 detects that the Import button is clicked by the user, the mobile device 300 generates a cloning file including currently selected functions and transmits the generated cloning file to the second image forming device 200 tagged by a user.

Figure 14E:
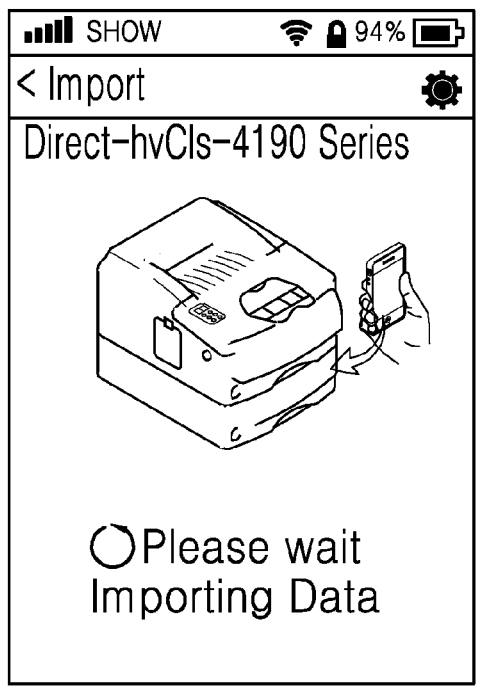

FIG. 14E illustrates that the mobile device 300 transmits a cloning file to the second image forming device 200. When a user tags the mobile device 300 to the second image forming device 200 to be cloned, the mobile device 300 transmits a cloning file to the second image forming device 200.

Figure 14F:
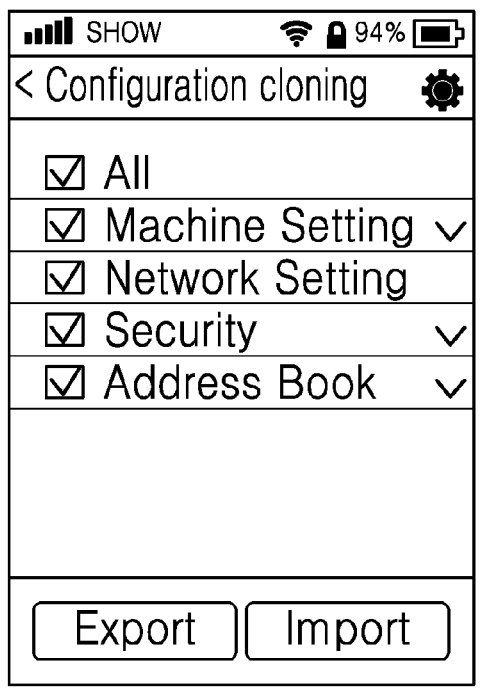

FIG. 14F illustrates a screen image displayed by the mobile device 300. After the mobile device 300 transmits a cloning file to the second image forming device 200, the mobile device 300 displays functions included in a current cloning file again. A user may import a cloning file to a third image forming device or export a cloning file from the third image forming device by clicking an Import button or an Export button.

Figure 15A:
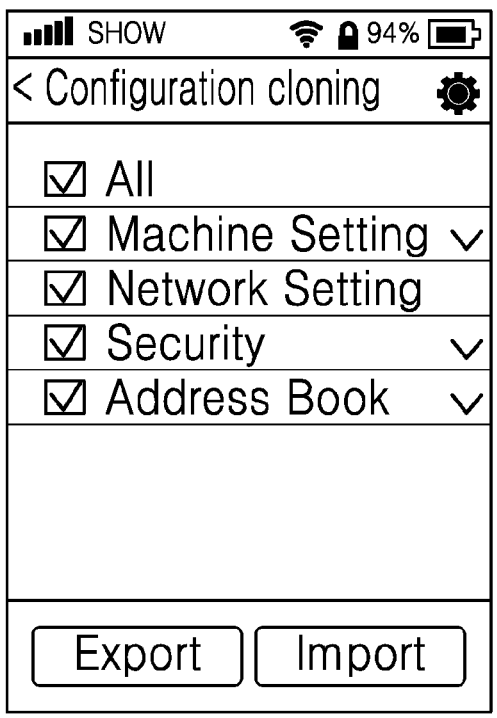
FIGS. 15A and 15B illustrate an exemplary selection by a user of a function by using a mobile device.
Figure 15B:
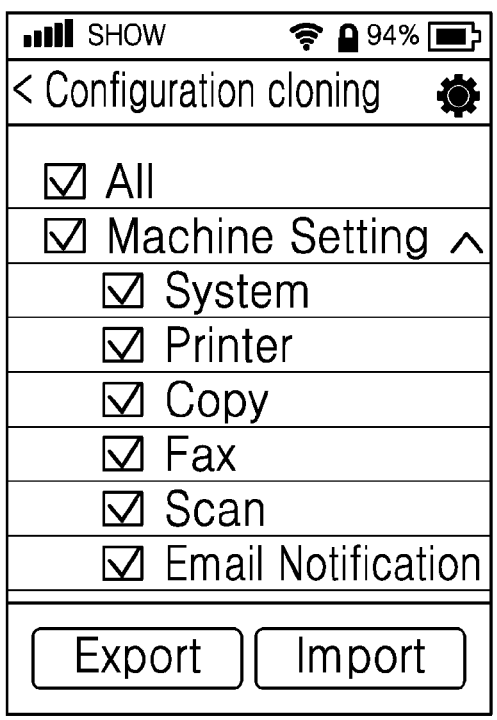

FIGS. 15A and 15B illustrate an exemplary display of a selection of a function by a user using a mobile device.

FIG. 15A illustrates that the mobile device 300 displays functions included in a cloning file. User selections of displayed functions may be determined based, for example, on whether boxes displayed at the right are checked. Functions corresponding to checked boxes are functions selected by a user, whereas functions corresponding to unchecked boxes are functions not selected by a user. The "All" item is an item for selecting or unselecting all functions. From among the displayed functions, functions including sub-functions may be indicated by expansion symbols, for example, to the right. When a user selects a symbol, the mobile device 300 displays corresponding sub-functions.

FIG. 15B illustrates an exemplary display of sub-functions. FIG. 15B illustrates that the function Machine Setting is selected by a user and the mobile device 300 displays sub-functions of the function Machine Setting. The sub-functions of the function Machine Setting include System, Printer, Copy, Fax, Scan, and Email Notification. A user may select some of sub-functions. The mobile device 300 may perform a cloning process by using only sub-functions selected by the user.

FIG. 16 illustrates capability information regarding an image forming device. Capability information varies from one image forming device model to another. Furthermore, as illustrated in FIG. 16, capability information may be generated in the XML format. If capability information is generated in the XML format, the image forming device 100 or the mobile device 300 may recognize respective items based on strings. Therefore, different types of image forming devices may be set to values identical to capability information by analyzing strings of capability information.

Capability information may include information regarding version of the XML format, cloning model names, and date at which the capability information is generated. Furthermore, the capability information illustrated in FIG. 16 includes values regarding machinesettingsystem, machinesettingprinter, machinesettingcopy, and machinesettingfax. Therefore, another image forming device which received the capability information illustrated in FIG. 16 may set values regarding machinesettingsystem, machinesettingprinter, machinesettingcopy, and machinesettingfax to be identical to those as illustrated in FIG. 16.

FIG. 17 illustrates a cloning file according to an embodiment. FIG. 17 shows a cloning file generated in the XML format. The image forming devices 100 and 200 may transmit and receive a cloning file directly or via the mobile device 300. The first image forming device 100 that generates a cloning file may generate a cloning file in the XML format cloning file as illustrated in FIG. 17. The second image forming device 200 which receives a cloning file analyzes strings included in the cloning file, determines functions respectively indicated by the strings, and updates set values of the second image forming device 200 to be identical to set values corresponding to the functions.

Figure 18:
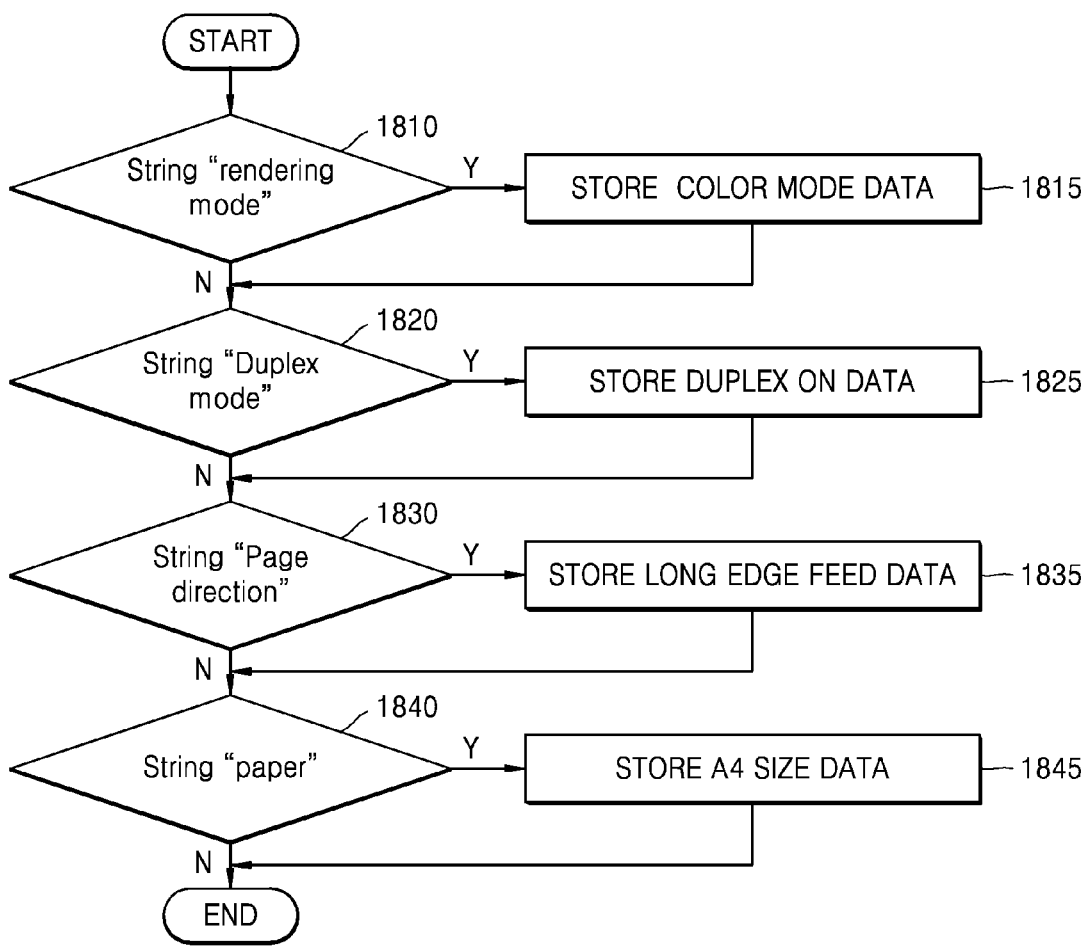
FIG. 18 illustrates a method of analyzing a cloning file according to an embodiment.

FIG. 18 illustrates a method of analyzing a cloning file according to an embodiment. Referring to FIG. 18, if strings included in a cloning file include a particular word, the image forming device 100 may store set values regarding the particular word. If there are various types of image forming devices, each of the image forming devices may extract set values regarding only some of functions included in a cloning file and store the set values.

In operation 1810, the image forming device 100 determines whether strings of a cloning file include the word 'rendering mode.' If the strings include the word 'rendering mode,' the method proceeds to operation 1815 and stores color mode data. If not, the method proceeds to operation 1820.

In operation 1815, the image forming device 100 sets mode data to color to print data in colors.

In operation 1820, the image forming device 100 determine whether strings of a cloning file include the word 'duplex mode.' If the strings include the word 'duplex mode,' the method proceeds to operation 1825, in which duplex on data is stored. If not, the method proceeds to operation 1830.

In operation 1825, the image forming device 100 sets duplex data to on, so that data may be printed on both surfaces of a printing paper.

In operation 1830, the image forming device 100 determines whether strings of a cloning file include the word 'page direction.' If the strings include the word 'page direction,' the method proceeds to operation 1835, in which long edge feed data is stored. If not, the method proceeds to operation 1840.

In operation 1835, the image forming device 100 sets feed data to long edge, so that data may be printed in vertical direction.

In operation 1840, the image forming device 100 determines whether strings of a cloning file include the word 'paper.' If the strings include the word 'paper,' the method proceeds to operation 1845, in which A4 size data is stored. If not, the method is terminated.

In operation 1845, the image forming device 100 sets paper size to A4, so that data may be printed on an A4 printing paper.

Although FIG. 18 shows cloning regarding only four functions, set values regarding necessary functions may be extracted and a cloning process may be performed by using the set values according to image forming devices.

Figure 19:
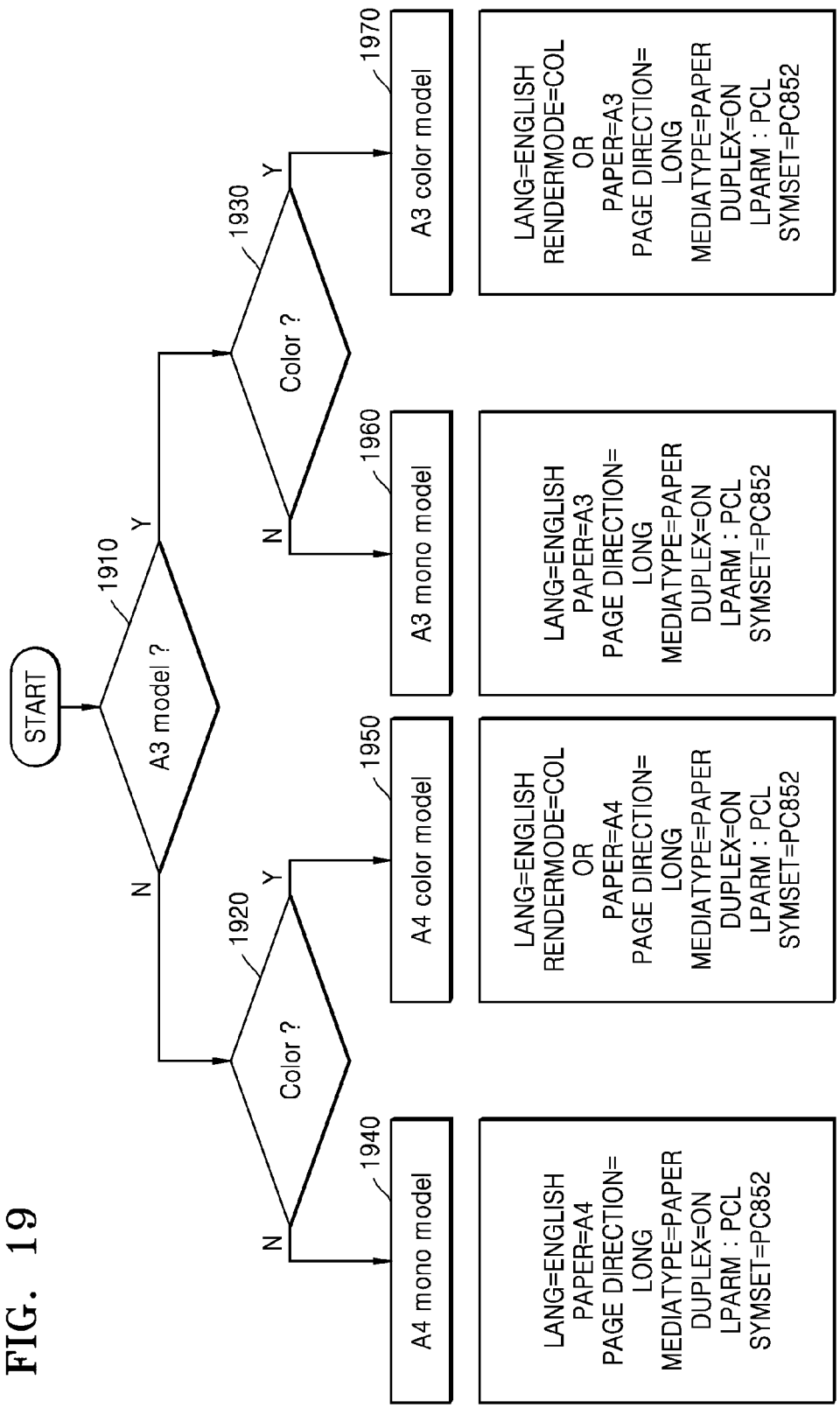
FIG. 19 illustrates an exemplary method of performing a cloning process by using a product number of an image forming device.

FIG. 19 illustrates a method of performing a cloning process by using a product number of an image forming device. The second image forming device 200 that received the product number of the first image forming device 100 may generate a cloning file via operations illustrated in FIG. 19.

The second image forming device 200 analyzes product specification based on the product number of the first image forming device 100. Product specifications according to product numbers may be stored in the second image forming device 200 in advance or may be obtained from the internet.

In operation 1910, the second image forming device 200 determines whether product specification of the first image forming device 100 corresponds to A3 model. If the first image forming device 100 is an A3 model, the method proceeds to operation 1930. If not, the method proceeds to operation 1920.

In operation 1920, the second image forming device 200 determines whether product specification of the first image forming device 100 supports colors. If the first image forming device 100 supports colors, the method proceeds to operation 1950. If not, the method proceeds to operation 1940.

In operation 1930, the second image forming device 200 determines whether product specification of the first image forming device 100 supports colors. If the first image forming device 100 supports colors, the method proceeds to operation 1970. If not, the method proceeds to operation 1960.

In operation 1940, the second image forming device 200 updates set values to print data on an A4 printing paper in grayscale.

In operation 1950, the second image forming device 200 updates set values to print data on an A4 printing paper in colors.

In operation 1960, the second image forming device 200 updates set values to print data on an A3 printing paper in grayscale.

In operation 1970, the second image forming device 200 updates set values to print data on an A3 printing paper in colors.

Other set values like a language, a printing direction, and duplex printing may be set in similar regards.

Figure 20:
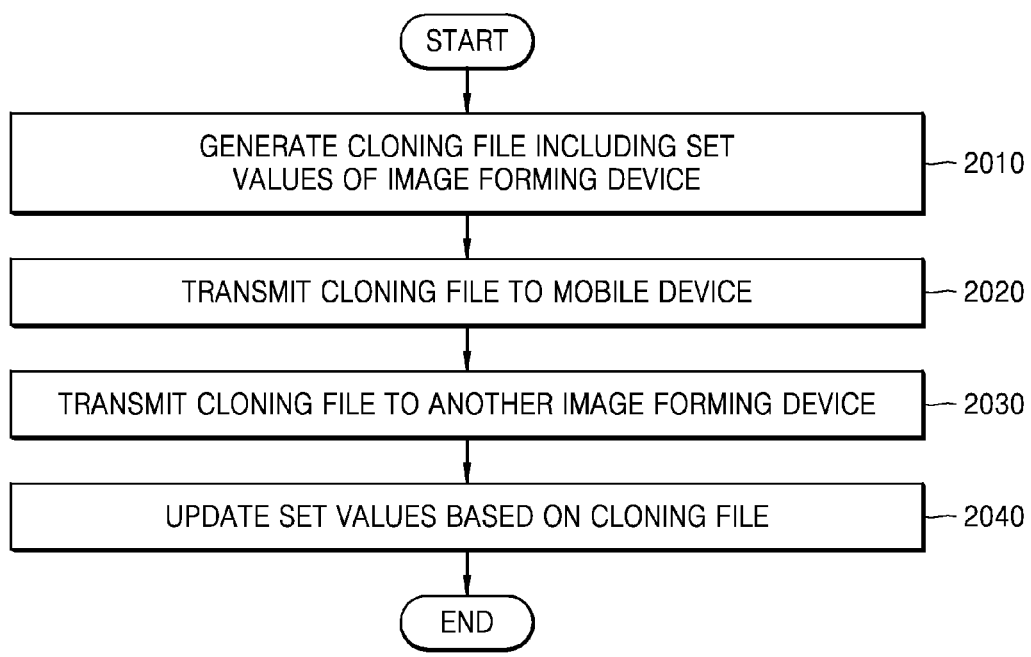
FIG. 20 illustrates a cloning method according to an embodiment.

FIG. 20 is a flowchart for describing a cloning method according to an embodiment. Referring to FIG. 20, a mobile device may clone two image forming devices wirelessly.

In operation 2010, an image forming device generates a cloning file including set values.

In operation 2020, the image forming device transmits the generated cloning file to the mobile device.

In operation 2030, the mobile device transmits the received cloning file to another image forming device.

In operation 2040, the other image forming device updates set values based on the cloning file.

An image forming device according to an embodiment may transmit and receive a cloning file to and from a mobile device via a wireless communication.

An image forming device according to an embodiment may generate a cloning file in the XML format.

An image forming device according to an embodiment may generate an encrypted cloning file by using an encryption key input by a user.

An image forming device according to an embodiment may transmit and receive a cloning file to and from only a mobile device that is successfully authenticated.

An image forming device according to an embodiment may be wirelessly connected to a mobile device via NFC and may transmit and receive a cloning file to and from the mobile device.

An image forming device according to an embodiment may generate a cloning file regarding functions selected by a user.

An image forming device according to an embodiment may perform a cloning process based on an analysis of print data.

An image forming device according to an embodiment may perform a cloning process based on analysis of product specification based on a product number.

A mobile device according to an embodiment may transmit and receive a cloning file to and from an image forming device via a wireless communication.

A mobile device according to an embodiment may extract set values included in print data and transmit the extracted set values to an image forming device.

A mobile device according to an embodiment may read a NFC tag attached to an image forming device and may transmit and receive a cloning file to and from the image forming device wirelessly.

The device described herein may comprise a processor to generate and execute data, a memory for storing program data, a permanent storage such as a disk drive, a communications port for handling communications with external devices, and user interface devices, including a display, keys, etc. When software modules are involved, these software modules may be stored as program instructions or computer-readable codes executable on the processor on a non-transitory computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

The present invention may be described in terms of functional block components and various processing operations. Such functional blocks may be realized by hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. The words "mechanism" and "element" are used broadly and are not limited to mechanical or physical embodiments, but can include software routines in conjunction with processors, etc.

The particular implementations illustrated and described herein are illustrative examples of the invention and are not intended to otherwise limit the scope of the invention in any way. The connecting lines, or connectors illustrated in the various figures presented are intended to represent exemplary relationships and/or physical or logical couplings between the various elements. It should be noted that alternative or additional relationships, physical connections or logical connections may be present in a practical device.

The use of the terms "a" and "an" and "the" and similar referents in the context of describing the invention (especially in the context of the claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image forming device comprising:
a processor that generates a cloning file including set values of the image forming device;
a display that displays a plurality of functions supported by the image forming device that are selectable by a user by an input by the user of the image forming device; and
a wireless communication unit including a transmitter that transmits the cloning file to a mobile device for cloning another image forming device and a receiver that receives data indicating which of the plurality of functions are selected by the user,
wherein the processor generates the cloning file by including set values of functions selected by the user.

2. The image forming device of claim 1, wherein the processor generates the cloning file in an extensible markup language (XML) format.

3. The image forming device of claim 1, wherein the wireless communication unit performs an authentication by using an ID and a password input by the user, and
the cloning file is transmitted by the transmitter of the wireless communication unit to the mobile device only upon the authentication being successful.

4. The image forming device of claim 1, further comprising a NFC tag including data for a wireless communication with the mobile device.

5. The image forming device of claim 1, wherein the processor generates the capability information indicating functions supported by the image forming device, and
the transmitter of the wireless communication unit transmits the capability information to the mobile device.

6. The image forming device of claim 1, wherein upon the image forming device generating the cloning file, an operation of the image forming device is prohibited.

7. The image forming device of claim 6, wherein the display displays a message to the user regarding the operation of the image forming device being prohibited.

8. An image forming device comprising:
a wireless communication unit including a receiver that receives a data file from a mobile device; and
a processor that analyzes the received data file and performs a cloning process,
the received data file including a selected at least one function of a plurality of functions of the image forming device selected by a user at a display of the mobile device.

9. The image forming device of claim 8, wherein the received data file is a cloning file generated by another image forming device.

10. The image forming device of claim 9, wherein the cloning file is generated in the XML format.

11. The image forming device of claim 8, wherein the received data file is print data comprising a printing task.

12. The image forming device of claim 11, wherein the processor extracts set values included in the print data by parsing the print data and performs a cloning process by updating set values of the image forming device to the extracted set values.

13. The image forming device of claim 8, wherein the received data file is a file encrypted by using an encryption key input by a user.

14. The image forming device of claim 13, wherein the processor decrypts the encrypted data file by using an encryption key input by the user and performs a cloning process by updating set values of the image forming device to set values included in the decrypted data file.

15. The image forming device of claim 8, wherein the processor performs an authentication by using an ID and a password input by a user and receives the data file from the mobile device only upon the authentication being successful.

16. The image forming device of claim 8, further comprising a NFC tag for a wireless communication with the mobile device.

17. A mobile device comprising:
a processor that sets a cloning file to be exported from the mobile device;
a wireless communication unit including a receiver that receives a cloning file from a first image forming device, the cloning file to be set to be exported, and including a transmitter that transmits the set cloning file to be imported by a second image forming device; and a display that displays a plurality of functions supported by the first image forming device that are selectable by a user of the mobile device based on received capability information, wherein the transmitted set cloning file indicating the functions of the plurality of functions selected by the user.

18. The mobile device of claim 17, wherein the cloning file is generated by the first image forming device in an extensible markup language (XML) format.

19. The mobile device of claim 17, wherein the wireless communication unit performs authentications with the first and second image forming devices by using an ID and a password input by a user and transmits and receives the cloning file upon when the authentications being successful.

20. The mobile device of claim 17, further comprising a NFC reader for reading NFC tags attached to the first and second image forming devices.

21. A mobile device comprising:

a processor that sets a cloning file to be exported from the mobile device or to import a cloning file;

a wireless communication unit including a transmitter that transmits print data to an image forming device upon the cloning file being set to export to the image forming device; and a display that displays a plurality of functions supported by the image forming device that are selectable by a user of the mobile device based on received capability information, wherein the wireless communication unit includes a receiver that receives a cloning file generated by the image forming device upon the cloning file being to be imported by the mobile device.

22. The mobile device of claim 21, wherein the print data is generated in the printer job language (PJL) format.

23. The mobile device of claim 21, wherein the processor extracts set values included in the print data, and the transmitter of the wireless communication unit transmits the extracted set values to the image forming device.

24. The mobile device of claim 21, further comprising a NFC reader for reading a NFC tag attached to the image forming device.

25. The mobile device of claim 21, wherein the cloning file is generated by using set values included in the print data.

* * * * *

UNITED STATES PATENT AND TRADEMARK OFFICE
CERTIFICATE OF CORRECTION

PATENT NO.        : 9,575,700 B2                             Page 1 of 1
APPLICATION NO.   : 14/621753
DATED             : February 21, 2017
INVENTOR(S)       : Ki-tae Kim et al.

It is certified that error appears in the above-identified patent and that said Letters Patent is hereby corrected as shown below:

On the Title Page

Item [Prior Publication Data] (65):
Above Line 1, insert -- US 2017/0024176 A9   January 26, 2017 --

Signed and Sealed this
Sixteenth Day of May, 2017

Michelle K. Lee
*Director of the United States Patent and Trademark Office*